US011226720B1

(12) United States Patent
Vandivere et al.

(10) Patent No.: US 11,226,720 B1
(45) Date of Patent: Jan. 18, 2022

(54) NATURAL LANGUAGE PROCESSING SYSTEM AND METHOD FOR DOCUMENTS

(71) Applicant: Agile Upstream Group, Inc., Magnolia, TX (US)

(72) Inventors: Nicholas E. Vandivere, Spring, TX (US); Michael B. Kuykendall, Spring, TX (US)

(73) Assignee: ThoughtTrace, Inc., Magnolia, TX (US)

( * ) Notice: Subject to any disclaimer, the term of this patent is extended or adjusted under 35 U.S.C. 154(b) by 102 days.

(21) Appl. No.: 15/887,689

(22) Filed: Feb. 2, 2018

Related U.S. Application Data

(60) Provisional application No. 62/584,527, filed on Nov. 10, 2017, provisional application No. 62/573,542, filed on Oct. 17, 2017, provisional application No. 62/454,648, filed on Feb. 3, 2017.

(51) Int. Cl.
| | |
|---|---|
| *G06F 3/0482* | (2013.01) |
| *G06F 3/0484* | (2013.01) |
| *G06N 20/00* | (2019.01) |
| *G06F 16/93* | (2019.01) |
| *G06F 40/30* | (2020.01) |
| *G06F 40/106* | (2020.01) |

(52) U.S. Cl.
CPC .......... *G06F 3/0482* (2013.01); *G06F 3/0484* (2013.01); *G06F 16/93* (2019.01); *G06F 40/106* (2020.01); *G06F 40/30* (2020.01); *G06N 20/00* (2019.01)

(58) Field of Classification Search
CPC ...... G06F 3/0482; G06F 3/0484; G06F 16/93; G06F 40/30; G06F 40/106; G06N 20/00
See application file for complete search history.

(56) References Cited

U.S. PATENT DOCUMENTS

| | | | | |
|---|---|---|---|---|
| 8,122,005 B1* | 2/2012 | Juang | ..................... | G06F 16/353 |
| | | | | 707/710 |
| 9,092,802 B1* | 7/2015 | Akella | ..................... | G06F 40/30 |
| 9,659,084 B1* | 5/2017 | Zhang | ................. | G06F 3/04842 |
| 2010/0031141 A1* | 2/2010 | Summers | ............... | G06F 16/832 |
| | | | | 715/239 |
| 2014/0324808 A1* | 10/2014 | Sandhu | ................... | G06F 16/34 |
| | | | | 707/706 |
| 2016/0162591 A1* | 6/2016 | Dokania | ............... | G06F 16/954 |
| | | | | 707/738 |
| 2016/0189057 A1* | 6/2016 | Rao | ......................... | G06F 40/30 |
| | | | | 706/12 |

OTHER PUBLICATIONS

"User Interface," <https://techterms.com/definition/user_interface>, Mar. 31, 2009, pp. 1-2. (Year: 2009).*

* cited by examiner

*Primary Examiner* — Kyle R Stork
(74) *Attorney, Agent, or Firm* — Polsinelli PC; Gregory P. Durbin

(57) ABSTRACT

In various embodiments, the disclosed systems and methods may receive documents, analyze the documents, categorize portions of the analyzed documents, and present the images of the documents and at least a portion of the categories. The analysis may include identification of categories and the presentation may include indicia of the portion of the image of the document related to the category. The systems and methods disclosed may allow querying and/or reporting of a plurality of documents to facilitate processing.

31 Claims, 12 Drawing Sheets

FIG. 5

2. Term. Except as expressly provided below, and unless sooner terminated under other provisions hereof, this Lease shall remain in force for a term of 20 year from the data hereof, hereinafter called "Primary Term", and as long thereafter as Operations, as defined in Paragraph 5, are conducted upon the Leased Premises with no cessation of more than sixty (60) consecutive days. This is a "paid-up" lease, and no delay rental payments are necessary to maintain this Lease in effect during the Primary Term.

3. Royalty.

(a) Delivery and Payment. As royalty, lessee covenants and agrees:

royalties on oil and gas

3. Royalty.

(a) Delivery and Payment. As shut-in provisions

4. Shut-In Royalty. If there shall be a well on the Leased Premises capable of retained acreage (a) The term "Operations" as used in this Lease shall mean only (i)

(b) The term "Drilling Operations" as used in this Lease shall

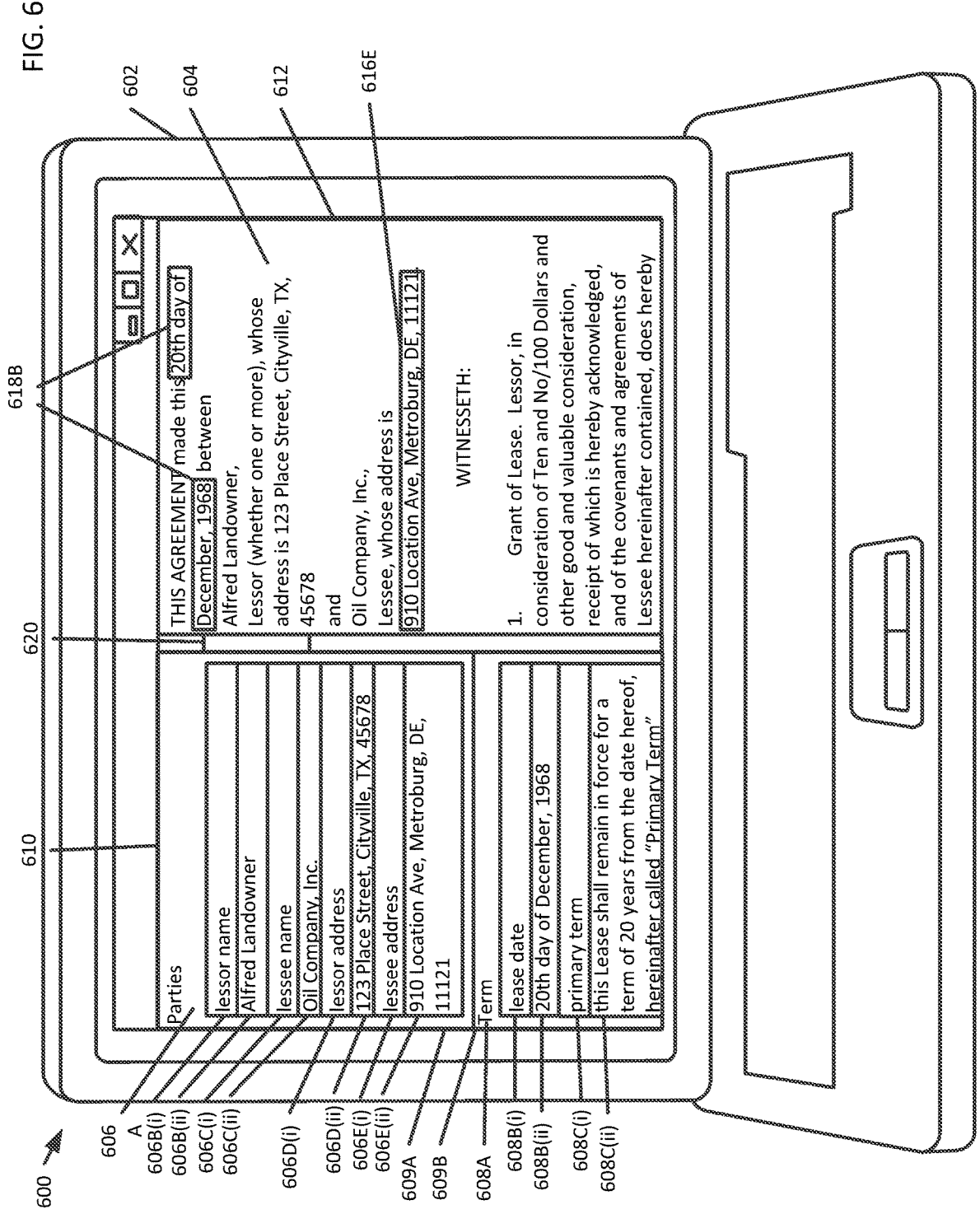

NATURAL LANGUAGE PROCESSING SYSTEM AND METHOD FOR DOCUMENTS

CROSS-REFERENCE TO RELATED APPLICATIONS

This application is related to and claims priority under 35 U.S.C. § 119(e) from U.S. Patent Appl. No. 62/454,648, filed Feb. 3, 2017 entitled "OIL AND GAS LEASE AND RELATED DOCUMENT PROCESSING," U.S. Patent Appl. No. 62/573,542, filed Oct. 17, 2017 entitled "NATURAL LANGUAGE PROCESSING SYSTEM AND METHOD FOR DOCUMENTS," and U.S. Patent Appl. No. 62/584,527, filed Nov. 10, 2017 entitled "NATURAL LANGUAGE PROCESSING SYSTEM AND METHOD FOR DOCUMENTS," the entire contents of each of which are incorporated herein by reference for all purposes.

TECHNICAL FIELD

The present invention relates to natural language processing of documents.

BACKGROUND

Electronic documents, particularly those scanned from paper copies and in an image format, may be of varying levels of quality and legible or only partially legible. Unless some form of post processing occurs, such image documents are often unsearchable or of limited searchability such as might be based on keyword matches. In the oil and gas industry, for example, organizations may maintain vast sets of legal documents pertaining to leases or other contracts. Leases, for example, are often provided to parties as copies which may be of good or bad quality, legible or partially legible, and generally unsearchable. Companies expend great resources reviewing and processing oil and gas related documents during procurements, due diligence, sales, etc., and such review or the like may involve numerous documents, at times reaching into the thousands. Depending on the project, simply identifying the correct documents, let alone properly analyzing each document, can be extraordinarily burdensome when the images are simple image documents with only perhaps limited searchability. In addition, each document may be organized uniquely and use different terms, even when they pertain to the same topic (e.g., an oil & gas related lease), adding to the difficulty in analyzing such documents.

It is with these observations in mind, among others, that aspects of the present disclosure were concerned and developed.

SUMMARY

Embodiments of the invention concern natural language processing systems and methods. In a first embodiment of the invention of a method for producing a user interface comprising a navigable document image and a list of concepts contained within the text of the document image includes receiving, by a processor, an electronic document, receiving, by a trained machine learning model, a text of the electronic document, the machine learning model producing one or more categories based upon the received text, and the categories corresponding to concepts related to the content of the text, associating, by the processor, the one or more categories with locations within the electronic document, wherein the locations correspond to the text based upon which the machine learning model produced the one or more categories, and generating, by the processor, a graphical user interface including a navigable image of the electronic document, wherein a user may view different areas of the document by interacting with the interface and a list of the one or more categories produced by the machine learning model, each listed category selectable and operably linked with the navigable image of the electronic document, wherein the navigable image of the electronic document navigates to a location within the navigable image of the electronic document in response to a user selecting a listed category, the location associated with the selected listed category.

In one embodiment, the machine learning model comprises one or more paragraph models, each paragraph model associated with a particular category and wherein each paragraph model is fed a paragraph of text and outputs whether the text conforms to the associated particular category.

In one embodiment, the method further includes the trained machine learning model producing one or more subcategories based upon the received text, the one or more subcategories associated with locations corresponding to the text based upon which the machine learning model produced the one or more subcategories, the graphical user interface further including the one or more subcategories produced by the machine learning model, each listed subcategory selectable and operably linked with the navigable image of the electronic document, and wherein the navigable image of the electronic document navigates to a location within the navigable image of the electronic document in response to a user selecting a subcategory, the location associated with the subcategory.

In one embodiment, the machine learning model comprises one or more sentence models, each sentence model associated with a particular subcategory and wherein each sentence model is fed a sentence of text and outputs whether the text conforms to the associated particular subcategory.

In one embodiment, the electronic document is received as an image file and converted to a text format using optical character recognition software.

In one embodiment, the subcategories of the graphical user interface further include one or more text snippets associated with each subcategory, and each text snippet comprises a portion of the received text based upon which the machine learning model produced the associated subcategory.

In one embodiment, each text snippet is selectable and operably linked with the navigable image of the electronic document, wherein selecting a text snippet causes the navigable image of the electronic document to navigate to the location associated with the extracted text wherefrom the machine learning model produced the associated category.

In one embodiment, selecting a category causes the graphical user interface to apply a visually identifying element to the location within the navigable image of the electronic document.

In one embodiment, selecting a text snippet causes the graphical user interface to apply a visually identifying element to the location within the navigable image of the electronic document.

In one embodiment, conceptually similar categories are displayed more closely together.

In one embodiment, the machine learning model is trained using supervised machine learning techniques.

In one embodiment, the machine learning model is periodically retrained with new data.

In one embodiment, two or more processors are used to perform the entirety of the steps.

In one embodiment, the machine learning model is applied using parallel processes.

In one embodiment, the categories include parties, term, lease location and description, shut-in provisions, royalties on oil and gas, other royalties, pooling and units, title, assignment, surrender, retained acreage, surface, subsurface, payments and audit, legal, lease header, and unused.

In one embodiment, the sub-categories include continuous drilling and operation, lessor name, lessee name, lessor address, lessee address, lease date, primary term, secondary term, gross acreage, state, county, royalty on oil provision, royalty percentage on oil, royalty on gas provision, royalty percentage on gas, cost fee royalty, shut-in royalty provision, shut-in period, shut-in price, acreage limitation, recordation requirements, special field rules, antientireties, lessor warranty, warranty disclaimer, lessee furnished notice provisions, surrender obligations, surrender notice requirements, continuous drilling and operation provision, force majeure, surface Pugh clause, depth clause, surface usage restriction, geophysical and seismic provision, setback provision, payments, and lessor interest clause provision.

In another embodiment of the invention of a method for producing a user interface comprising a navigable document image and a list of concepts contained within the text of the document image includes receiving, by a processor, a plurality of electronic documents, receiving, by a trained machine learning model, a text of the plurality of electronic documents, the machine learning model producing one or more categories based upon the received text, and the categories corresponding to concepts related to the content of the text, assigning, by the processor, an ordering to the plurality of electronic documents, wherein the assigned order reflects a date of creation for each document of the plurality of electronic documents, associating, by the processor, the one or more categories with locations within the plurality of electronic documents, wherein the locations correspond to the text based upon which the machine learning model produced the one or more categories, identifying, by the processor, a conflicted category, wherein a conflicted category is associated with multiple texts, the texts having caused the machine learning model to produce a shared category, and wherein the texts contain incompatible semantic content, removing, by the processor, the association of one or more of the multiple texts and the conflicted category, wherein the association is removed from texts being located in an electronic document assigned a later ordering than a semantically incompatible counterpart, and generating, by the processor, a graphical user interface including a navigable image of the electronic document, wherein a user may view different areas of the document by interacting with the interface and a list of the one or more categories produced by the machine learning model, each listed category selectable and operably linked with the navigable image of the electronic document, wherein the navigable image of the electronic document navigates to a location within the navigable image of the electronic document in response to a user selecting a listed category, the location associated with the selected listed category.

BRIEF DESCRIPTION OF THE DRAWINGS

FIG. 5 is an illustration of a user interface displaying categories and an image of a document, in this case an oil and gas legal document, in accordance with various embodiments of the subject technology;

FIG. 6 is an illustration of a user interface displaying categories and nested subcategories and an image of a document, in this case an oil and gas legal document, in accordance with various embodiments of the subject technology;

DETAILED DESCRIPTION

Figure 1:
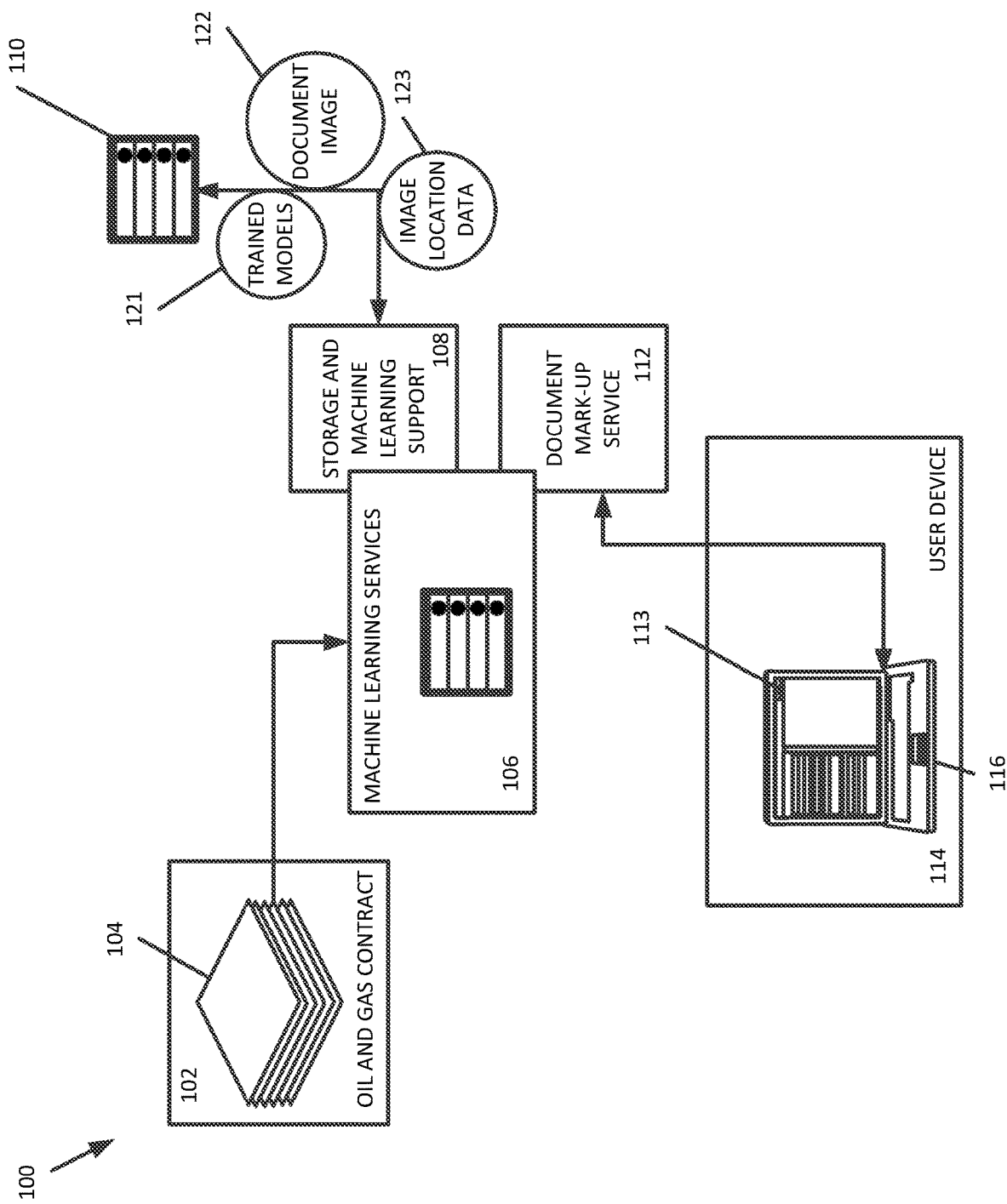
FIG. 1 is a system diagram for a natural language processing system for documents, such as oil and gas legal documents, in accordance with various embodiments of the subject technology.

Aspects of the present disclosure involve systems and methods for generating a user interface for an image document based on a generated list of categories and subcategories from an original electronic document. The categories and subcategories are generated through natural language processing ("NLP") based on machine learning. The categories and subcategories are locationally linked to text from the image document and identify the ontological content of the electronic document. Categories and subcategories are provided to a user through the interface allowing rapid and intuitive navigation of the electronic document through the displayed categories. As more documents are processed, the system may become more accurate at identifying categories and subcategories. Further, similarity groupings across multiple documents may be achieved by the system by applying clustering across a multitude of received documents. As more documents are received, the clustering may become more effective at determining which documents are similar to each other. The present disclosure illustrates aspects of the technology in relationship to an example of an oil and gas legal document. However, it is to be appreciated that the systems and methods disclosed are not limited to oil and gas legal documents but rather can be realized for a multitude of document types and for a multitude of industries.

An oil and gas legal document generally refers to a legal document memorializing a transaction and defining the rights and obligations of the parties to the transaction, with such transactions including sales, leases, assignments, and divestitures, relating to the oil and gas industry. Often, only document images, such as a PDF, JPG, PNG, and the like are available and the document images may not contain directly searchable text. For any given type of transaction, the legal documents may vary in numerous ways and such variations may be from numerous sources, even across documents for the same type of transaction. For example, the terminology and organization of the documents may vary, and such variations may be based on the origin of the document (e.g., one party may use a different form of document than another) and terms and organization may change over time due to changes in the law or those drafting the documents, and other changes. Since terminology may vary in the document and related portions may be in different portions of the document, merely making text searchable does not substantially increase speed of processing and/or decrease error rates. Oilfield exploration and drilling typically involves large parcels of land and aggregation of rights from a plurality of land and/or titleholders, and the aggregation of rights can involve numerous legal documents and transaction including those contemporaneous with the aggregation as well as historical documents needed to ensure that rights over time have been properly conveyed. The systems and methods disclosed can identify the conceptual content (e.g., particular types of clauses or provisions of a legal document) of a document regardless of the exact terminology, the arrangement and organization of the document, and other differences across documents. A more detailed discussion of various systems and methods of the present disclosure follows.

Generally, the system receives a document as an image file (e.g., PDF, JPG, PNG, etc.), and the system extracts text from the image file. In some embodiments, the system may receive one or more images of, for example, oil and gas documents. In some cases, the received image document may have been pre-processed to extract the text and thus includes the text level information. Text extraction can be done by various tools available on the market today falling within the broad stable of Optical Character Recognition ("OCR") software. The extracted text may be associated or otherwise linked with the particular location in the document from which it was found or extracted.

In some embodiments, the system may generate one or more graphical user interfaces to facilitate receiving and storing the images of, for example, oil and gas documents. For example, a graphical user interface may include a field that allows users to provide file locations for uploading, an area that allows users to drag and drop files, and/or any other appropriate file transfer technology, etc. In some embodiments, the file transfer may be secured using one or more security protocols.

Extracted text may then be fed into a trained machine learning model. The trained machine learning model may be trained on sample data and/or previously received documents so that it can identify categories and subcategories, which it associates with particular sections of text. Thus, even if a document does not include particular section titles, spacing key-words or other identifiers, extracted text may still be associated with an appropriate category. Having identified categories, which may further include subcategories, associated with particular sections of the text, the particular locations associated with the particular sections of text can then also be associated with the identified categories and subcategories as well.

A graphical user interface may then be generated and presented to a user to allow them to navigate through the processed image of the image document. The graphical user interface can include a first portion, including an image of the document, and a second portion including information related to one or more categories present and/or not present in the document. Navigation may be based on category and subcategory where the user interface automatically scrolls to the location in the document where the text associated with the selected category is located, or the text may be selected to cause the user interface to identify to the category and/or subcategory to which the text pertains. The ordering of the extracted text in the second portion may not be the same as the ordering of the source text (e.g., the portion of the image from which the text is extracted) in the image of the document. Categories and subcategories generally refer to provisions and components of provisions of a transactional document. A category may encompass one or more subcategories, and a subcategory may be related to more than one category.

In the particular context of legal documents for the oil and gas industry, some example categories include, without limitation, "parties," "term," "lease location and description," "shut-in" (e.g., shut-in provisions), "royalties on oil and gas," "pooling and units," "title," "assignment," "surrender," "retained acreage," "surface," "subsurface," "payments and audit," "legal," "lease header," "unused" (e.g., portions unassigned to categories), etc. Subcategories for the categories "parties" and "term" may include, but are not limited to, "lessor name," "lessee name," "lessor address," "lessee address," "lease date," "primary term," and "secondary term." Subcategories for the category "lease location and description" may include, but are not limited to, "gross acreage," "state," and "county." Subcategories for the category "royalties" may include, but is not limited to, "royalty on oil provision," "royalty percentage on oil," "royalty on gas provision," "royalty percentage on gas," and "cost fee royalty." Subcategories for the category "shut-in" may include, but is not limited to, "shut-in royalty provisions," "shut-in period," and "shut-in price." Subcategories for the category "pooling" may include, but is not limited to, "acreage limitations," "recordation requirements," "special field rules," and "antientireties." Subcategories for the category "title, assignment, and surrender" may include, but is not limited to, "lessor warranty," "no warranty provisions," "lessee furnished notice provisions," "surrender obligations," and "surrender notice requirements." Subcategories for the category "retained acreage" may include, but is not limited to, "continuous drilling and operation provisions," "force majeure," "surface Pugh clauses," and "depth clauses." Subcategories for the category "surface provisions" may include, but is not limited to, "no surface usage provisions," "geophysical and seismic provisions," and "setback provisions." Subcategories for the category "payments and audits" may include, but is not limited to, "payments and lessor interest clause provisions," etc.

The generated graphical user interface includes a display of a list of the categories and subcategories identified by the machine learning models. Each listed category and subcategory may be selected by the user and, when selected, will navigate a view of the document to the text associated with that category or subcategory. The text may be highlighted. For example, a graphical user interface can be provided listing categories on a first portion of the screen and the image of the document may be displayed on another portion of the screen. For example, the user interface may display a "parties" category, and upon receiving a selection of the "parties" category, the user interface will display the portion of the image document containing the respective text (e.g., the text determined by the machine learning model to be pertaining to the "parties" category), and in some cases the respective text may also be highlighted. So, if the lessor and the lessee (parties to the lease) were in the first paragraph of a 10 page image document, upon receiving a selection of the category "parties," the user interface would automatically display the first paragraph of the first page.

An excerpt from an exemplary oil and gas document is presented below, to which various operations discussed below will refer in order to more clearly explain the disclosed embodiments.

TABLE 1

Exemplary Oil and Gas Lease Agreement Excerpt ("Example Document Text")

3. Royalty.
  (a) Delivery and Payment. As royalty, lessee covenants and agrees:
    (i) to deliver or cause to be delivered to the credit of Lessor, into the pipe line or other receptacle to which Lessee may connect its wells, 50% of all oil, condensate and liquid hydrocarbons produced and saved by Lessee from the Leased Premises, or from time to time, at the option of Lessor, Lessee shall sell Lessor's share of such oil, condensate or liquid hydrocarbons with Lessee's share and shall pay Lessor 50% of the Gross Proceeds (as hereafter defined) received by Lessee or any Affiliate of Lessee (as hereafter defined) from the sale of all oil, condensate and liquid hydrocarbons produced and saved from the Leased Premises;
    (ii) to pay Lessor on gas and casinghead gas produced from the Leased Premises, payable on a well by well basis:
      (1) when sold by Lessee in an arms-length sale to an unaffiliated third party, 75% of the Gross Proceeds received by Lessee from the sale of such gas and casinghead gas, or
      (2) when sold to an Affiliate of Lessee, 25% of the Gross Proceeds, computed at the point of sale, from the sale of such gas by such Affiliate of Lessee; and
      (3) when used by Lessee (other than for Operations on the Leased Premises as hereafter provided), 20% of the market value at the point of use.

Figure 2:
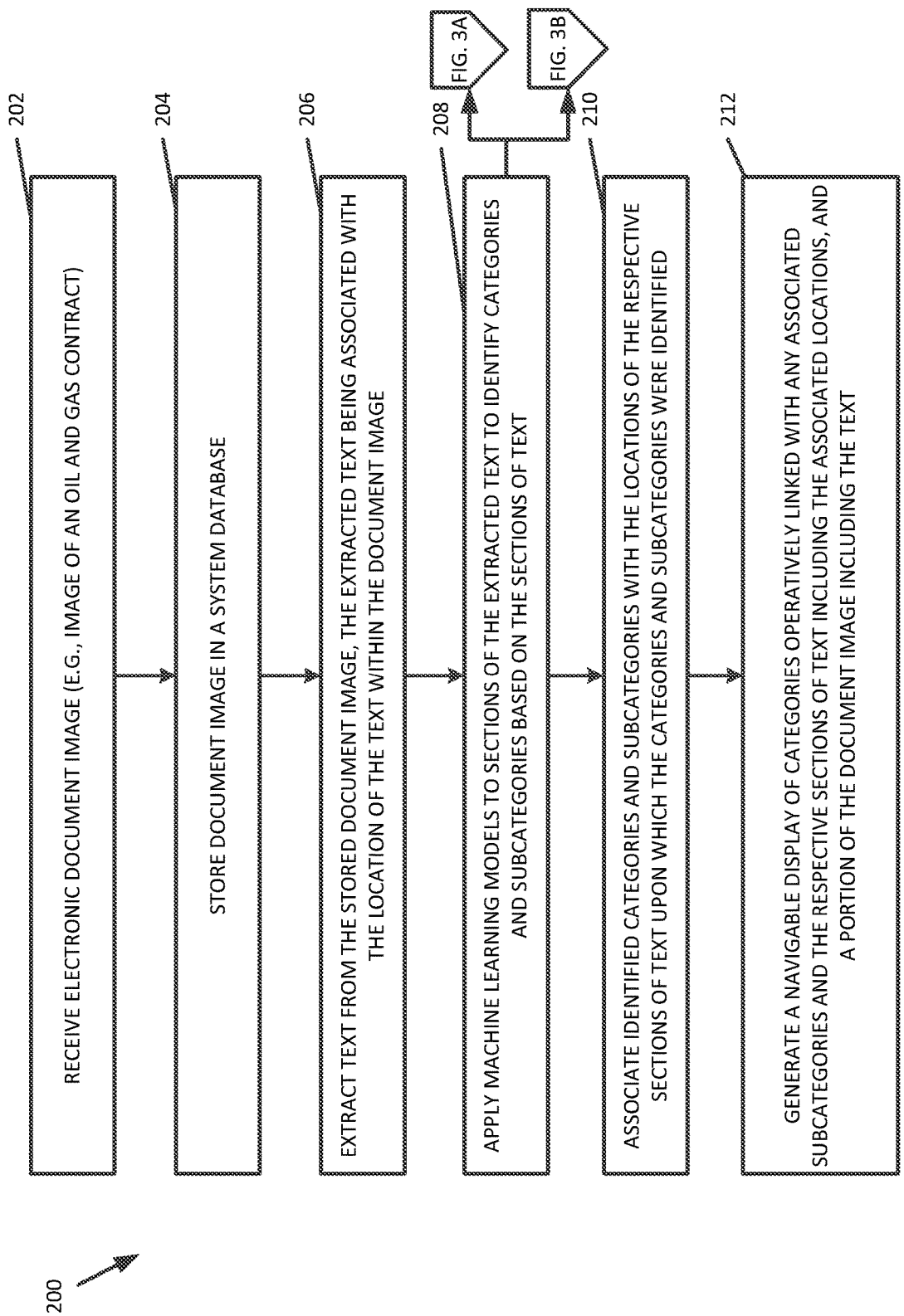
FIG. 2 is a flowchart of a method for a natural language processing system for documents, such as oil and gas legal documents, in accordance with various embodiments of the subject technology.

FIG. 1 depicts one example of a system for processing an unorganized raw image document into an interactive list and document image 122 accessible on a user device 114. FIG. 2 depicts a method for generating a list of categories and subcategories related to and navigably linked to an image of an electronic document (such as an oil and gas contract). Referring to FIGS. 1 and 2, the system 100 receives a provided electronic document image 102 (operation 202) or more generally obtains electronic access to such a document through a file system, a database, and the like. In a typical implementation, the document will be one among many documents (104). In one possible example, the electronic document image 102 is that of an oil and gas legal document. For example, the system may receive an image of an oil and gas contract 104 including the Example Document Text of Table 1.

In the example illustrated, the electronic document image 122 is stored in a system database or other memory provided by a machine learning services platform 106 as a remote device 110 (operation 204). The database can be a relational or non-relational database, and it will be apparent to a person having ordinary skill in the art which type of database to use or whether to use a mix of the two. In some other embodiments, the document image may be stored in a short term memory rather than a database or be otherwise stored in some other form of memory structure. Documents stored in the system database may be used later for training new machine learning models and/or continued training of existing machine learning models through utilities provided by the machine learning services platform 106. The machine learning services platform 106 can be a cloud platform or locally hosted. In some embodiments, machine learning services platform includes third-party commercial services (e.g., Amazon Machine Learning, Azure Machine Learning, Stanford NLP, etc.) which provide model generation and training.

The system 100 then extracts text from the document image via, e.g., an Optical Character Recognition ("OCR") software of a storage and machine learning support 108 subsystem, and the text is associated with the location in the document image from where it was extracted (operation 206). The locations of the extracted text can be saved to the remote device 110 as image location data 123 specifically tied to the relevant document image 122. For example, text extracted from the beginning of the document image is associated with a respective location of the navigable document image portion of a user interface 113 rendered at a computing device. In some embodiments, the location based association between the image document and the text may be implemented as a JSON object (as in Table 2 below) or a relational or non-relational data structure having a string variable and a collection of longs describing the distance of the area associated with the text from the edge of the document. The association may also be implemented in Python as a dictionary data structure, the location information serving as a key and the text as the value linked to that key. The above implementations are intended to be descriptive example only and other implementations will be apparent to a person having ordinary skill in the art.

TABLE 2

Exemplary JSON Object ("Example Data Structure")

[{"Top":5.53,"Bottom":6.10,"Left":3.99,"Right":7.07,"RangeStart":0,"RangeEnd":6,"Text":"Texas",
{"Top":5.53,"Bottom":6.10,"Left":7.52,"Right":13.02,"RangeStart":6,"RangeEnd":16,"Text":"Producers"},
{"Top":5.53,"Bottom":6.10,"Left":13.37,"Right":14.64,"RangeStart":16,"RangeEnd":19,"Text":"88"},
{"Top":5.53,"Bottom":6.10,"Left":15.05,"Right":17.42,"RangeStart":19,"RangeEnd":24,"Text":"Paid"},
{"Top":5.53,"Bottom":6.24,"Left":17.88,"Right":22.22,"RangeStart":24,"RangeEnd":32,"Text":"Up -Arc "}]

Revisiting the Example Document Text, here the text can be extracted from the stored PDF of the associated document that includes the Text by running OCR software on the PDF and outputting, from the OCR software, a data object containing each word of text of the document, including the Example Document Text, and a relative positioning of each word (e.g., "Royalty" along with an OCR character string offset ranging 3 to 12 and Top, Bottom, Left, and Right image position in terms of percentage offset with respect to the corresponding image of the document of 5.53, 6.10, 7.01, and 12.50 respectively).

Machine learning models are then applied to the text to identify categories and subcategories for the text (operation 208). In one example, machine learning services 106 utilizes storage and machine learning support 108 to retrieve trained models 108 from remote device 110, which may include a database or other data storage facility such as a cloud storage service. The machine learning models may identify categories and subcategories based on learned ontologies which are taught to the models through training on batches of text from previous documents received by the system and from training data, which may be acquired during the initial deployment of the system or otherwise. A learned ontology can allow a machine learning model to identify a category or subcategory based on relationships between words, key words, and other factors determined by the machine learning algorithm employed, and will identify concepts and information embedded in the syntax and semantics of text. Thus, where a simple key word search of extracted text may not be capable alone of identifying a "lot description," machine learning can be used to analyze the extracted text and identify the "lot description" based on a previously identified location of the lot (e.g., via the lot state, lessor state, applicable laws state, etc.) to identify probable formats for the lot description and/or other qualities of the text (e.g., proximate categories, such as lessor name or related categories, such as state, and the like). In another example, a "shut-in" provision may not include a header titling it "shut-in" and may not use the words "shut-in" in the provision. Thus, the machine learning models may process the extracted words to identify if a portion of the extracted text is a "shut-in" provision based on the use of similar words (e.g., "gas not being sold"), the use of sets of similar words being used in proximate locations (e.g., "gas not being sold," "capable of producing," and "will pay") to identify a category. The machine learning algorithm employed may be a neural network, a deep neural network, support vector machines, Bayesian network, a combination of multiple algorithms, or any other implementation that will be apparent to a person having ordinary skill in the art.

Referring to the Example Document Text, the machine learning model may assign the category "royalties on oil and gas" to the Example Document Text. In such a case, the machine learning model has learned an ontology mapping the text to the category "royalties on oil and gas" but not to "other royalties" or various other categories. Subcategories may be mapped by the machine learning models having learned other ontologies as well. For example, the text of paragraph 3(a)(i) of the Example Document Text may cause the machine learning models to identify a "royalty on oil provision" subcategory.

The method depicted in FIG. 2 may then associate identified categories and subcategories with location data related to the document image (operation 210). The location data may be the earlier discussed location data associated with the particular text which caused the machine learning model to output the particular category. In other words, one or more anchors may be identified in the extracted text through visible and/or hidden tags such as a category or subcategory. This location data maps the locations within the document image to the one or more categories or subcategories.

For example, the identified category "royalties on oil and gas" may be associated with the page offset values for each of the words in the Example Document Text. The word "Royalty" may be associated with the 5.53, 6.1, 7.01, and 12.5 page edge offsets discussed above; the next word, "(a)" may be associated with Top, Bottom, Left, and Right image positions of 7.10, 7.67, 6.85, and 7.15 respectively; etc. The aggregated values of the adjacent words can then be mapped to "royalties on oil and gas", resulting in a set of location values of 5.53, 18.9, 6.10, 93.42 being associated with the category. The subcategory, "royalty on oil provision", can be similarly mapped.

Once categories and subcategories have been mapped, a navigable display of categories and subcategories in operative linkage can be displayed alongside a navigable version of the document image (operation 212). Operatively linked categories and subcategories allow a user to navigate the document image by selecting the categories and subcategories rather than directly manipulating the document image. In other words, operation 212 can produce a graphical user interface as that depicted in FIG. 5 and FIG. 6 and discussed below. The categories and subcategories, along with their associated location data, can be stored and transmitted by various mechanisms, including a JavaScript Object Notation ("JSON") object having a field containing the category, a field containing the document page or pages covered by the category, and another field containing the locational information described above and tied to the respective page of the document. The described JSON object is just one embodiment and is to be taken as a non-limiting example. Other embodiments will be apparent to a person of skill.

Figure 3:
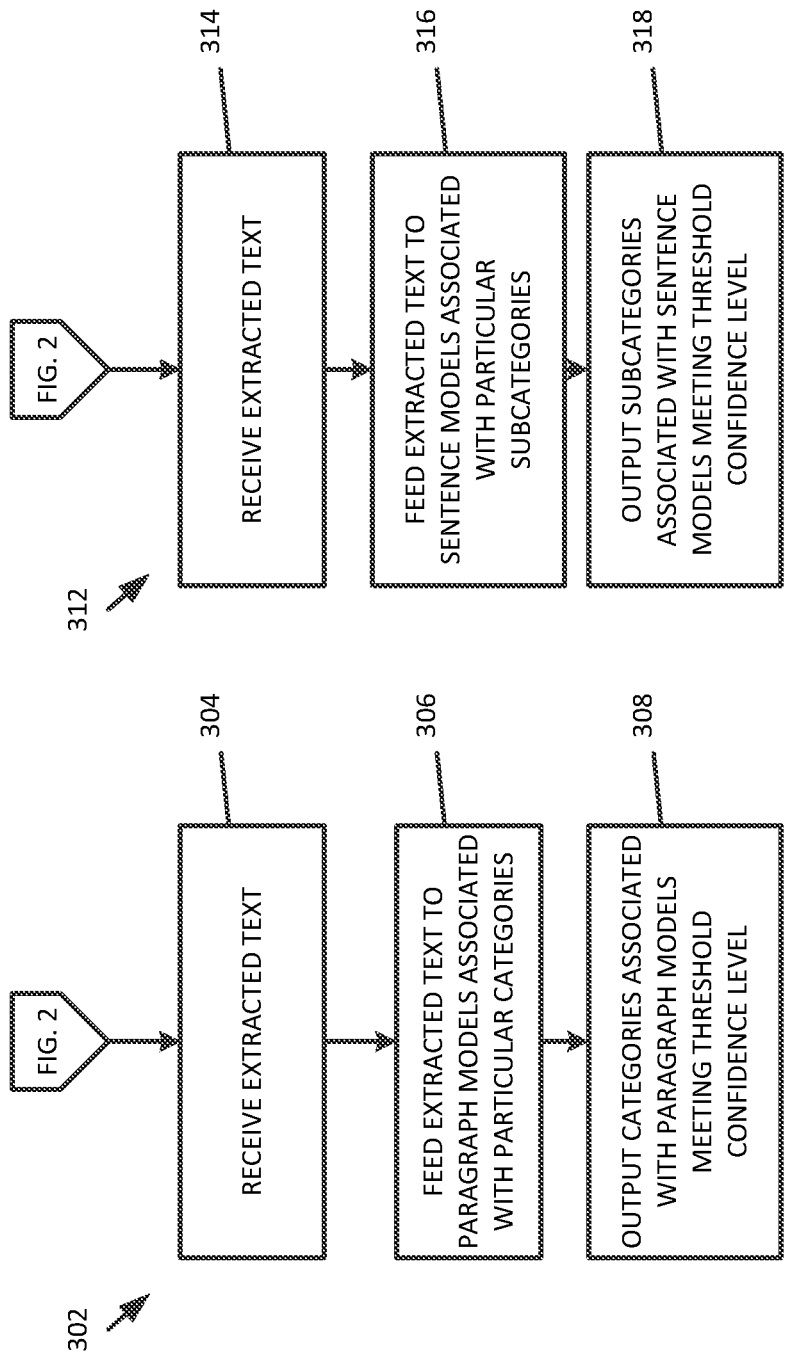
FIG. 3A is a flowchart of a method for producing categories from paragraph text fed into a trained machine learning model.
FIG. 3B is a flowchart method for producing subcategories from sentence text fed into a trained machine learning mode.

FIG. 3A and FIG. 3B show a paragraph orchestration 302 and a sentence orchestration 312 respectively for processing paragraphs of text and sentences of text respectively. In one aspect, paragraph and sentence orchestrations may be run independent of each other. In another, outputs of paragraph orchestration 3A may be included as inputs to the sentence models of 3B.

As depicted by FIG. 3A, a system implementing the method 302 first receives extracted text (operation 304). In the depicted embodiment, the text may be received following a preceding operation 206 extracting text data from a document image. In one aspect, the extracted text may constitute a quantity and/or organization of text making up a paragraph. Generally, the paragraph orchestration 302 receives the paragraph text from a parser which has processed a larger text into distinct paragraphs, as that described below in regards to FIG. 4. The extracted text may then be fed into machine learning models, each model trained to identify particular categories from text inputs (operation 306). The models may be support vector machines ("SVMs"), Long Short Term Memory networks ("LSTM"), convolutional neural networks ("CNNs"), recurrent neural networks ("RNNs"), Naïve Bayse, other machine learning models which will be apparent to a person of ordinary skill in the art, or a mixture of multiple and different models.

In one aspect, the models output a score corresponding to a degree of confidence the model has that the ingested text reflects the category it is trained to identify (further discussed below in reference to FIG. 4). Those models producing a score above a particular threshold will be considered to have identified a category from the text. In other embodiments, the model or models may produce a Boolean (i.e., true or false), associated with achieving a threshold or not in some embodiment, or other value as will be apparent to a person of ordinary skill in the art.

Turning to FIG. 3B, a sentence orchestration 312 is depicted. A sentence orchestration 312 operates on similar principles to the paragraph orchestration 302 discussed above. The sentence orchestration 312 first receives text extracted from a sentence (operation 314). Generally, the sentence orchestration 312 receives extracted text from a parser specialized in processing text into constituent sentences, such as that discussed below in reference to FIG. 4. The text is fed into a plurality of models which are each trained to identify particular subcategories (operation 316) and then those models may output identified subcategories according to which models produce a score from the ingested text above a certain threshold (operation 318).

Similarly to operation 306, the models of operation 316 may be SVMs, LSTMs, CNNs, RNNs, Naïve Bayse, various other machine learning models, or a mixture of models as will be apparent to a person of ordinary skill in the art.

In some embodiments, the sentence models of the sentence orchestration 312 can also receive the output categories from the paragraph orchestration 302 performed earlier on paragraph text from which the sentence text was extracted. In some embodiments, the paragraph orchestration 302 can receive a paragraph of text (i.e., a contiguous block of text potentially containing multiple sentences) and the sentence orchestration 312 may then receive the individual sentences of that text and the output of the paragraph orchestration 302 at operation 314. A sentence may be read, or tokenized, as a sentence based on a variety of rules such as creating a discrete sentence from all text before a period, all text on a single line, all text before a semicolon, or many other rules as will be apparent to a person of ordinary skill in the art. Once paragraph categories are received, for example, the sentence models used may be limited to particular models specialized at identifying subcategories of the received categories. Such models may be specialized by training them only on data related to a particular category such as, e.g., "royalties on oil and gas".

Processing the Example Document Text from Table 1 above, paragraph orchestration 302 receives the entirety of the text contained within the Example Document Text (i.e., all of "3. Royalty." and text following within section "3") at operation 304. In some embodiments, each line break may be processed as a new paragraph. In other embodiments, various other particular characters or groupings of characters may cause the system to process the respective text as a new paragraph. In these other embodiments, the respective components of the Example Document Text from Table 1 above, such as, e.g., "3. Royalty," may each be provided to the paragraph orchestration 302 one at a time and as individual paragraphs. The text is then fed into the machine learning models of operation 306, a model trained to identify "royalties on oil and gas" category among them. Of the models, only "royalties on oil and gas" achieves the confidence threshold and so operation 308 outputs "royalties on oil and gas" as a category for the paragraph.

As the Example Document Text continues into the sentence orchestration 312, seven sentences may be tokenized from the paragraph based on a rule tokenizing sentences as words before a period, colon, or semicolon. Tokenized sentences of the Example Document Text may include, among other sentences, "(i) to deliver or cause to be delivered to the credit of Lessor, into the pipe line or other receptacle to which Lessee may connect its wells, 50% of all oil, condensate and liquid hydrocarbons produced and saved by Lessee from the Leased Premises, or from time to time, at the option of Lessor, Lessee shall sell Lessor's share of such oil, condensate or liquid hydrocarbons with Lessee's share and shall pay Lessor 50% of the Gross Proceeds (as hereafter defined) received by Lessee or any Affiliate of Lessee (as hereafter defined) from the sale of all oil, condensate and liquid hydrocarbons produced and saved from the Leased Premises;". In one embodiment, the sentences may be fed by themselves into the sentence models of operation 316. In any case, operation 318 may produce a "royalty on oil provision" subcategory after ingesting the sentence extracted from the Example Document Text.

Figure 4:
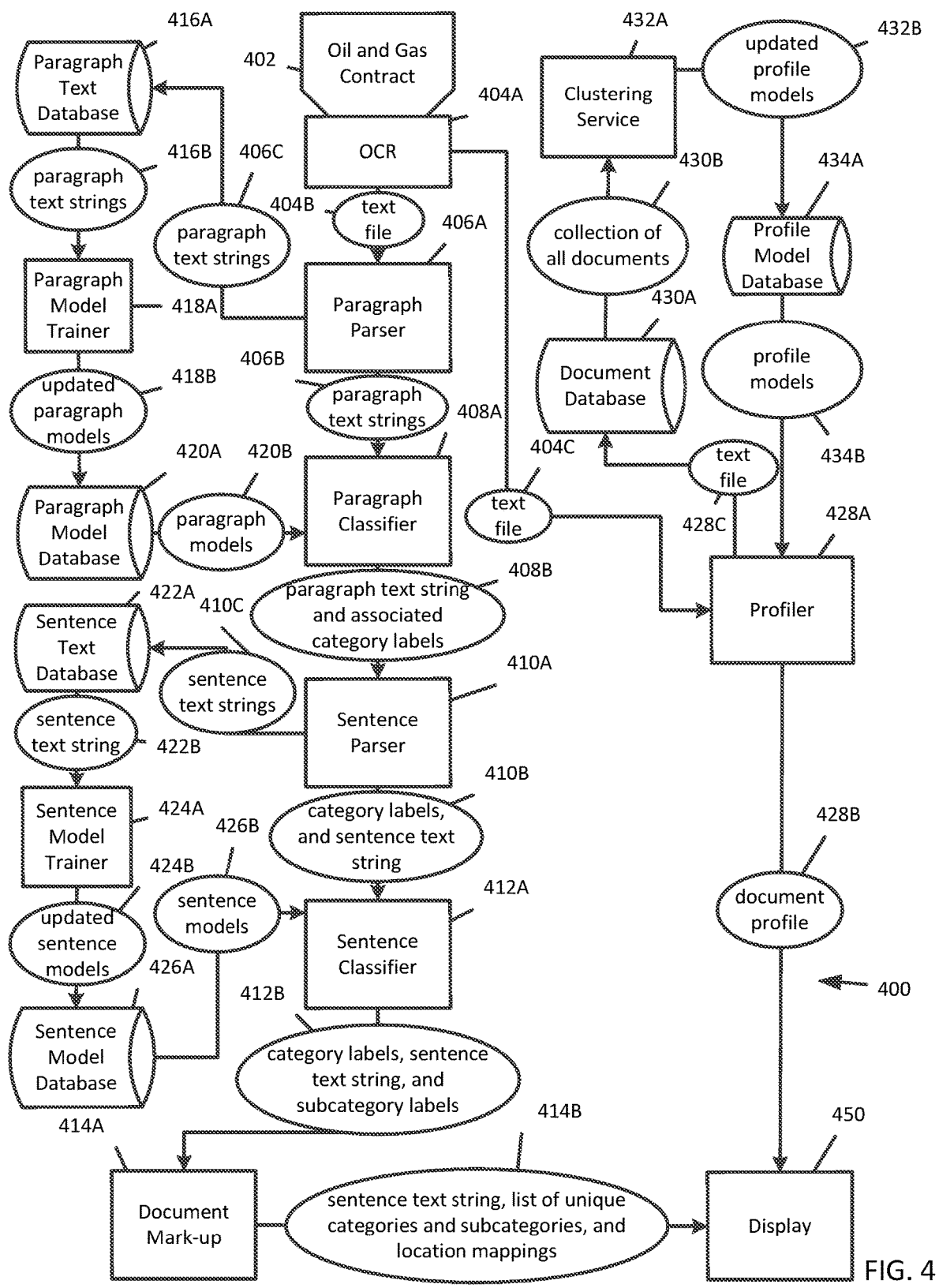
FIG. 4 is a system diagram for a natural language processing system for documents, such as oil and gas legal documents, in accordance with various embodiments of the subject technology.

FIG. 4 depicts a system architecture and method for natural language processing of documents in one specific implementation geared toward legal documents, such as those for the oil and gas industry. To begin, an OCR module 402A accesses a document and generates a text file 404B. A paragraph parser 406A then processes the text file 404B into paragraph text strings 406B, which are passed downstream. The paragraph parser 406A extracts discrete paragraphs of text from the text file 404B. Paragraph parser 406A may utilize a variety of parsing rules. In one aspect, all text between empty lines may be extracted as a discrete paragraph. In another, text following a numeral, and before a sequential numeral, may be extracted as a discrete paragraph. In yet another, machine learning models may be trained to identify paragraphs in a text, which are then each extracted as discrete paragraphs. Other embodiments will be apparent to a person of ordinary skill in the art.

The OCR module 404A can also output a text file 404C to a profiler 428A, which can provide a comparative analysis of the received oil and gas legal document 402 against documents previously received by system 400 to group documents by statistical factors unlikely or impossible to be considered by a human analyst (further discussed below).

A paragraph parser 406A can, after receiving or otherwise accessing the text file 404B, generate paragraph text strings 406B for subsequent processing by a paragraph classifier 408A. The paragraph parser 406A can also generate and output paragraph text strings 406C to a paragraph text database 416A for storage and later training, and for access by the paragraph classifier. The paragraph classifier 408A applies paragraph models 420B to the paragraph text strings 406B. The paragraph models 420B can be first trained and regularly trained thereafter by a paragraph model trainer 418A as will be further discussed below. Having fed the paragraph text strings 406C to the paragraph models 420B, paragraph classifier 408A produces a data object 408B containing a paragraph text string and labels of paragraph categories identified by the paragraph models 420B.

A sentence parser 410A receives the data object 408B from the paragraph classifier 408A. Applying tokenization rules to the paragraph text string of the data object 408B, the sentence parser generates sentence text strings 410C from the paragraph text, which may be stored in a sentence text database 422A. The sentence text strings may then be processed by a sentence classifier or used by a sentence model trainer 424A, further discussed below. The sentence parser 410A may also generate and provide to the sentence classifier 412A a data object 410B containing category labels identified by paragraph classifier 408A and sentence text strings 410C. The sentence classifier 412A applies sentence models 426B, which may be retrieved from sentence model database 426A and may be limited to models which are specialized in the categories identified upstream by the paragraph classifier 408A. The sentence classifier 412A can perform operations 316 and 318 to output a data object 412B. The data object 412B contains the category labels produced by the paragraph classifier 408A, the sentence text strings 410C produced by the sentence parser 410A, and subcategory labels identified by the sentence classifier 412A.

A document mark-up module 414A may receive data object 412B. The document mark-up module 414A associates the categories and subcategories, held by the data object 412B, with locations within an image of the received oil and gas document 402 from which the text causing the production of the categories and subcategories was extracted. Categories and subcategories may be consolidated into a list of unique values (i.e., no category or subcategory is listed twice) and the above mappings associated with those unique values—for example, where a category is identified twice and associated with different location information between each identification, the document mark-up module 414A produces a list containing the category only once but associated with both of the locations just described. The document mark-up module 414A may output a data object 414B containing sentence text strings, a list of unique entries of categories and subcategories, and the above-described location mappings associated with the unique entries of categories and subcategories. A display 450 may receive data object 414B and render an interface as depicted in FIGS. 5 and 6 and detailed below.

The system 400 depicted in FIG. 4 can include data flows for training both the paragraph models 420B and the sentence models 426B. Paragraph text database 416A may receive paragraph text strings 406C from the paragraph parser 406A and stores the paragraph text strings 406C for use by a paragraph model trainer 418A. The paragraph model trainer 418A can train the paragraph models 420B which are used to identify categories by Paragraph Classifier 408A. This training may be supervised or unsupervised, as will be apparent to a person of ordinary skill in the art. Supervised training generally includes human subjects reviewing the paragraph text strings 416B and providing category labels to them based on their individual experience and knowledge. Training may also include human subjects reviewing categories generated by the paragraph models 420B and assigning a success or failure value to the model based upon the categories identified. For example, were the system to categorize a term duration, e.g., "the term of the lease shall be 10 years from this date", as "party", the human subject would assign a failure value to the model; alternatively, were the system to categorize "the term of the lease shall be 10 years from this date" as a "term", the human subject may assign a success value. The paragraph model trainer 418A may then learn from these human-assigned values by stochastic gradient descent ("SGD"), coordinate descent, or other algorithms which will be apparent to a person of ordinary skill in the art.

Once training is complete, updated paragraph models 418B are provided to a paragraph model database 420A. The models stored in the paragraph model database 420A can then be provided as paragraph models 420B to the paragraph classifier 406A. The paragraph model trainer 418A may be run on a verity of schedules, including only once to first train the models, nightly, weekly, monthly, or any other frequency that will be apparent to a person of ordinary skill in the art.

A sentence text database 422A may receive sentence text strings 410C from the sentence parser 410A. The sentence text strings 410C may then be stored for later use by a sentence model trainer 424A. The sentence model trainer 424A may be run according to a range of schedules which will be apparent to a person of ordinary skill in the art. When run, the sentence model trainer 424A receives sentence text strings 422B from the sentence text database 422A. The sentence model trainer 424A may include the same training mechanisms described above in regards to the paragraph model trainer 418A. The sentence model trainer 424A may then produce updated sentence models 424B which are then provided to the sentence model database 426A for later us by the sentence classifier 412A.

The system 400 may also include a profiler 428A for identifying documents across the history of documents received by the system which are similar to the received document 402. The OCR module 404A may transmit a text file 404C containing the text data of the document 402. The profiler 428A may then identify a document profile 428B matching the document 402 to other documents previously received and profiled by the system 400 by applying profile models 434B to the received text file 404C.

The profiler 428A may also send text file 428C to a document database 430A for storage and later use in generating and training profile models 434B. The text file 428C may be a duplicate of the text file 404C received by the profiler 428A from the OCR module 404A.

The document database 430A may send a collection of all documents 430B to a clustering service 432A for generating updated profile models 432B. The updated profile models 432B may be generated on a nightly, weekly, monthly, or any other basis as will be apparent to a person of ordinary skill in the art. The clustering service 432A may apply clustering algorithms to identify similar documents along a variety of factors. Various cluster analysis algorithms may be used such as K-means, though other algorithms will be apparent to a person of ordinary skill in the art. Generally, Clustering Service 432A utilizes unsupervised machine learning to create groups of documents and so may determine similarity based on factors unlikely or even impossible to be considered by a human analyst such as, e.g., cosine similarity of vectorized documents.

The clustering service 432A may then send updated profile models 432B to a profile model database 434A. Profile model database 434A may then provide the profile models 434B to the profiler 428A for use in generating a document profile 428B by applying profile models 434B to text file 404C. The document profile 428B may then be provided to the display 450 for presentation to the user.

Returning again to the Example Document Text, an example execution of the system is described below. The Example Document Text can be received by the OCR module 404A, producing a text file 404B containing the text described the Example Document Text (along with the remainder of text of the document not depicted). The paragraph parser 406A may then receive the text file 404B of the Example Document Text and produce paragraph text strings 406B and 406C containing, e.g., the text provided in the Example Document Text as a single paragraph. The paragraph text strings 406C will be preserved in the paragraph text database 416A for use in training paragraph models 420B. The paragraph classifier 408A receives, e.g., the text provided in the Example Document Text and applies the paragraph models 420B to the text, producing the data object 408B containing the paragraph text string 406B of the Example Document Text and, e.g., the category "royalties on oil and gas". The sentence parser 410A receives the data object and produces sentence text strings 410C which are stored in the sentence text database 422A for training the sentence models 426B. The data object 410B is also produced and sent to the sentence classifier 412A.

As the Example Document Text continues to be processed by the system 400, the sentence classifier 412A produces the data object 412B by applying particular sentence models, the sentence models determined by the categories produced by the paragraph classifier 408A above, to the sentence text strings contained in the data object 410B. The sentence text strings here can include, e.g., the text of 3(a)(i) of the Example Document Text. Having applied the sentence models 426B to the text of 3(a)(i) of the Example Document Text, the sentence classifier 412A can include, e.g., the subcategory "royalty on oil provision" in the data object 412B, among other subcategories associated with other sentence strings produced from the Example Document Text.

The document mark-up module 414A then receives the data object 412B having, e.g., the category "royalties on oil and gas", the subcategory "royalties on oil provision", and the sentence text strings of the Example Document Text. The document mark-up module 414A generates a data object to be sent to the display 450 that contains, e.g., the above recited items and mappings of the sentence text strings to an image of the Example Document Text so that an interface may be provided to a user in the vein of FIG. 6 described below. Detailed descriptions of FIG. 5 and FIG. 6 follow, wherein the Example Document Text is again used to relay greater understanding of the methods and system disclosed herein.

FIG. 5 depicts an exemplary user interface 500 generated according to the various systems and methods discussed herein, and in this example, as displayed on a computing device 502 before any category has been selected. The user interface 500 includes a list of categories 510. As depicted in FIG. 5, three unique categories 504A (royalties on oil and gas), 506A (shut-in provisions), 508A (retained acreage) are shown; however, by using scroll bar 514, a user may move into and out of view of the entirety of the list of categories 510. The section of the user interface displaying the selectable categories is independently scrollable from other parts of the user interface. An image of a received document 512, e.g., oil and gas legal document 402, is displayed in a section of the user interface adjacent the section displaying the list of categories 510.

Returning to the list of categories 510, the category 504A (royalties on oil and gas) includes a text snippet 504B. The text snippet 504B provides a partial image of the text from which the paragraph classifier 408A identified the associated category 504A. In particular, the text snippet 504B is only partially displayed because it is not actively selected. In one embodiment, the text snippet 504B may be selected by a user, e.g., with a mouse click, and the text snippet 504B expands to display the entirety of the paragraph text associated with the category (not depicted). Further, the text snippet 504B may be operably linked to the document image 512 so that selecting the text snippet 504B causes the document image 512 to scroll to a position where the text location 504C matching the text snippet 504B is at the top of the visible document portion (not depicted). In some embodiments, the list of categories 510 may be operably linked to the document image 512 so that selecting, e.g., the category 504A (royalties on oil and gas) causes the document image 512 to scroll to a position where the text location 504C of the matching text snippet 504B associated with the selected category 504A is at the top of the visible document.

As can be seen, the list of categories 510 may include categories not currently visible in the document image 512, such as category 506A (shut-in provisions), and an associated text snippet 506B. As described above, upon selection of text snippet 506B by a user, document image 512 will shift to a view having the text of 506B at the top of the visible document.

The list of categories 510 may further include multiple text snippets 508B, 508C, 508D which each caused, e.g., the paragraph classifier 408A to identify the respective category. As depicted in FIG. 5, the category 508A (retained acreage) was identified by three or more paragraph text strings 406B, causing the category 508A to include the text snippets 508B, 508C, 508D displaying the same text content as that contained in the respective paragraph text strings 406B, for example.

FIG. 6 depicts another embodiment of an exemplary interface 600 generated according to the various systems and methods discussed herein, and in this example, as displayed on a computing device 602. The user interface 600 includes a list of categories 610. As depicted in FIG. 6, two unique categories 606A (Parties) and 608A (Term) are shown. An image of a received document 612, e.g., oil and gas legal document 402, is displayed in a section of the user interface adjacent the section displaying the list of categories 610. The interface 600 may allow navigation of the list of categories 610 and/or the document image 612 individually or jointly. For example, scrolling through the list of categories 610 may not scroll through pages of the document image 612.

The identified categories 606A (Parties) and 608A (Term) also contain lists of subcategories 609A, 609B respectively nested within each. As depicted in FIG. 6, the lists of subcategories are among those identified by the sentence classifier 412A of the system 400. The nested subcategory 609A contains all identified subcategories 606B(i) (lessor name), 606C(i) (lessee name), 606D(i) (lessor address), and 606E(i) (lessee address) associated with the category 606A (Parties). The nested subcategory 609B contains identified subcategories 608B(i) (lease date) and 608C(ii) (primary term) within the current view of the list of categories 610. A user may scroll down the list to reveal more subcategories using a scroll bar 620. Associated with each subcategory is a text snippet 606B(ii), 606C(ii), 606D(ii), 606E(ii), 608B(ii), 608C(ii) that displays the text from which the sentence classifier 412A generated the respective subcategory.

Categories 606A (Parties) and 608A (Term) are interactable and a user may click on them to collapse the respective nested subcategory lists 609A, 609B. Upon being collapsed, the collapsed category label is visible, e.g., "Parties", but the respective subcategories and associated text snippets are not, e.g., "lessor name", "Alfred Landowner", "lessee name", "Oil Company, Inc.", etc. Each text snippet 606B(ii), 606C(ii), 606D(ii), 606E(ii), 608B(ii), 608C(ii) may be operably linked to the document image 612 and, upon being selected by a user by clicking on it, cause a portion of the document image 612 scroll to a position where the text location of the respective snippet is in view. Further, selecting the text snippets may cause the associated text in the document image 612 to be highlighted or otherwise denoted by a marking overlay. Here, the text snippet 608B (ii) (lease date) has been selected and so a portion of the document containing the text 618B (20th day of December), matching the contents of the relevant text snippet 608B(ii), has been highlighted. Similarly, a portion of the document 616E (910 Location Ave, Metroburg, Del., 11121) 616E may be highlighted by the user clicking on the mapped text snippet 606E(ii) associated with subcategory 606E(i) (lessee address) containing the same text content.

Figure 7:
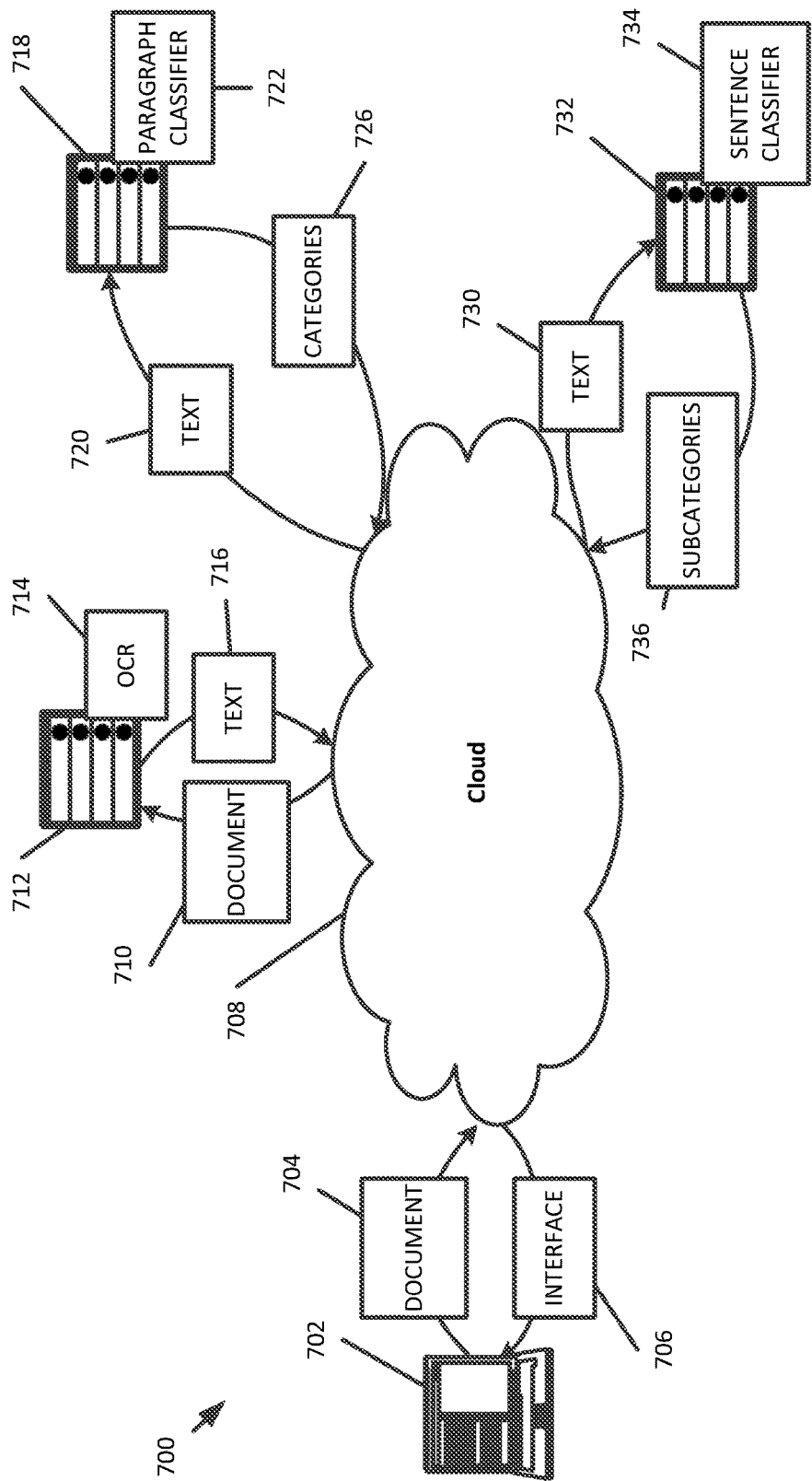
FIG. 7 is a system diagram for a natural language processing system for oil and gas legal documents, in accordance with various embodiments of the subject technology.

FIG. 7 depicts one embodiment of an architecture 700 implementing the system 400 over a cloud resource provider 708. As depicted, a terminal 702 uploads a document 704 to the cloud resource provider 708 where a version 710 is sent to a server 712 running OCR 714. The OCR 714 may extract text from the document 710 and send it back to the cloud service provider 708.

Once the cloud service provider 708 receives text 716, a text copy 720 may be sent to a server 722 running a paragraph classifier 724. The paragraph classifier 724 can then provide a list of identified categories back to the cloud resource provider 708.

The cloud resource provider 708 may also provide a text copy 730 to a server 732 running a sentence classifier 734. The sentence classifier 734 may then provide a list of identified subcategories 736 back to the cloud resource provider 708.

The paragraph classifier 722 and the sentence classifier 734 may be run in sequence or in parallel because they are run by separate servers 718, 732. In another embodiment (not depicted), multiple servers may each run an instance of a sentence classifier 734 or a paragraph classifier 722 so that each instance may receive, e.g., a sentence text string 410C or a paragraph text string 406B respectively and distribute the computing task of the methods 302, 312 across multiple devices in order to speed up completion of the method 200.

The cloud resource provider 708 may provide an interface 706 to a terminal 702. The interface 706 may be, e.g., a data object 414B containing text, lists of categories and subcategories, and mappings for an image of the document. Once received, the terminal 702 may perform the operation 212 and render, e.g., the interface 600 for the user. In various embodiments, the terminal 702 may be a personal computer, thin computer, laptop, mobile device, or other computing device as will be apparent to a person of skill in the art.

Figure 8:
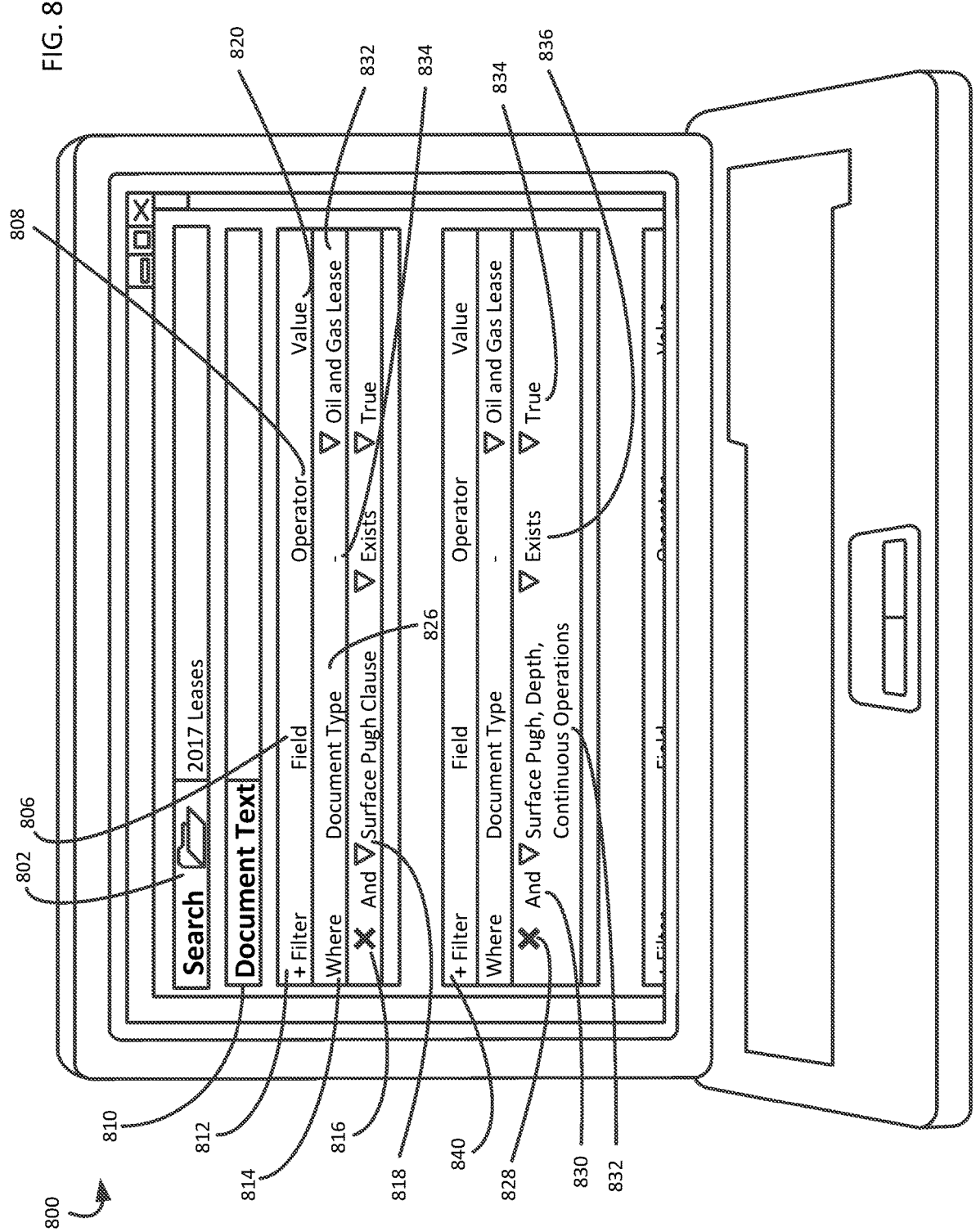
FIG. 8 is an illustration of a user interface displaying query and filter utilities for retrieving documents, in this case an oil and gas legal document, in accordance with various embodiments of the subject technology.

FIG. 8 illustrates an embodiment of a user interface 800 to facilitate queries and report generation based on a plurality of documents. Allowing searching across a plurality of documents based on the extracted text and/or associated categories may facilitate review (e.g., by users) of a plurality of documents in a quick and efficient manner. For example, unlike conventional systems that rely on OCT and key word searches, a user may not need to search each possible term that might identify a provision but rather select the category for a provision through the user interface 800.

As depicted, categories and/or properties of categories (e.g., key words, values, subcategories, etc.) can be provided by a user in the form of one or more filters 812 and 840. In response, a query may be generated which will retrieve all documents matching an aggregation of the filters 812 and 840. The user can specify the aggregation method (e.g., Boolean AND, Boolean OR, etc.) via a Boolean tab 830. For example, where a first filter 812 and a second filter 840 are applied with respective Boolean tabs 830 set to "and," only those documents satisfying both of the first filter 812 and the second filter 840 will be retrieved and provided to the user. In comparison, where the Boolean tab 830 is set to "or," so long as a document satisfies either of the applied filters 812 and 840, the document will be retrieved.

A directory selection field 802 informs the system where to look for the specified documents. Here, the directory selection field 802 is set to a directory named "2017 Leases." In some embodiments, a user may select a directory by typing an associated address into the field, such as "C:\Users\admin\Documents\" and the like. In some embodiments, a user may open a browser window by selecting the directory selection field 802 and navigate to the correct folder by mouse clicks (not depicted).

A user can enter exact keyword matches through a document text field 810. Only documents containing text identical to that entered into the document text field 810 may be returned. Where no content is provided to the document text field 810, the generated query may ignore exact text matches. Where text is provided along with filters, the document text field 810 can operate as another filter included in the resultant query, returning documents that only satisfy the filters 812, 840 as well as contain text matching that entered into the document text field 810. In some embodiments, the document text field 810 can allow for Boolean search arguments.

The filters 812, 840 may each include a field label 806, an operator label 808, and a value label 820. The field label 806 denotes a search field, such as a document type 826, category, or subcategory, which to query on. Where multiple types of documents are available for searching, the document type 826 selection may be used to limit the search to only a single type of document as defined by the value label 820. The value label 820 may be responsive to the field label 806 selection. For example, where document type 826 is selected, only values associated with the type of documents may be selected in the value label 820, such as "Oil and Gas Lease" 832. In some embodiments, aesthetic text 814 may be included in a filter 812, 840 to increase the intuitiveness of the interface. Here, "Where" is provided as aesthetic text 814 so that users may be aware that the filter 812 applies "where" a document type 826 is an oil and gas lease 832.

The operator label 808 may be selectable responsive to the field label 806 selection. For example, where document type 826 is the selected field label 806, no operator label 808 is available for selection and instead a dummy value, such as "—," is selected. In the case of a different field label 806 being selected, such as "Surface Pugh Clause" 818, the operator label 808 may provide a selection including the "Exists" selection.

Further restriction can be applied to the filters 812, 840 using the label 806. A "Surface Pugh Clause" may be selected as an additional field label 806. In some embodiments, multiple field labels 806 can be selected. Here, a selection 832 includes "Surface Pugh," "Depth," and "Continuous Operations." Responsive to the field label 806 selection, an "Exists" operator 836 can be selected. The value label 820 can determine a treatment of the operator label 808. For example, the "Exists" operator 836 may cause the vale label 820 to allow selection of either "True" 834 or "False" (not depicted).

The selection of the "True" 834 value label 808 may cause results of a search including just the filter 840 would to include only oil and gas lease documents containing text categorized and subcategorized as Surface Pugh, Depth, or Continuous Operations. In some embodiments, an inverse treatment can be selected by selecting "False" for the value label 808, in which case only documents not containing the selected categories and/or subcategories may be returned.

Further, each filter 812, 840 may be removed by selecting a delete icon 816, 828. In some embodiments, the delete icon 816, 828 can remove the entire filter, irrespective of the number of, for example, field label 806 selections included (e.g., "Surface Pugh Clause" 818 or "Surface Pugh, Depth, Continuous Operations" 832). In some other embodiments, the delete icon 816, 828 can remove the most recently added selection every time the delete icon is selected.

Figure 9:
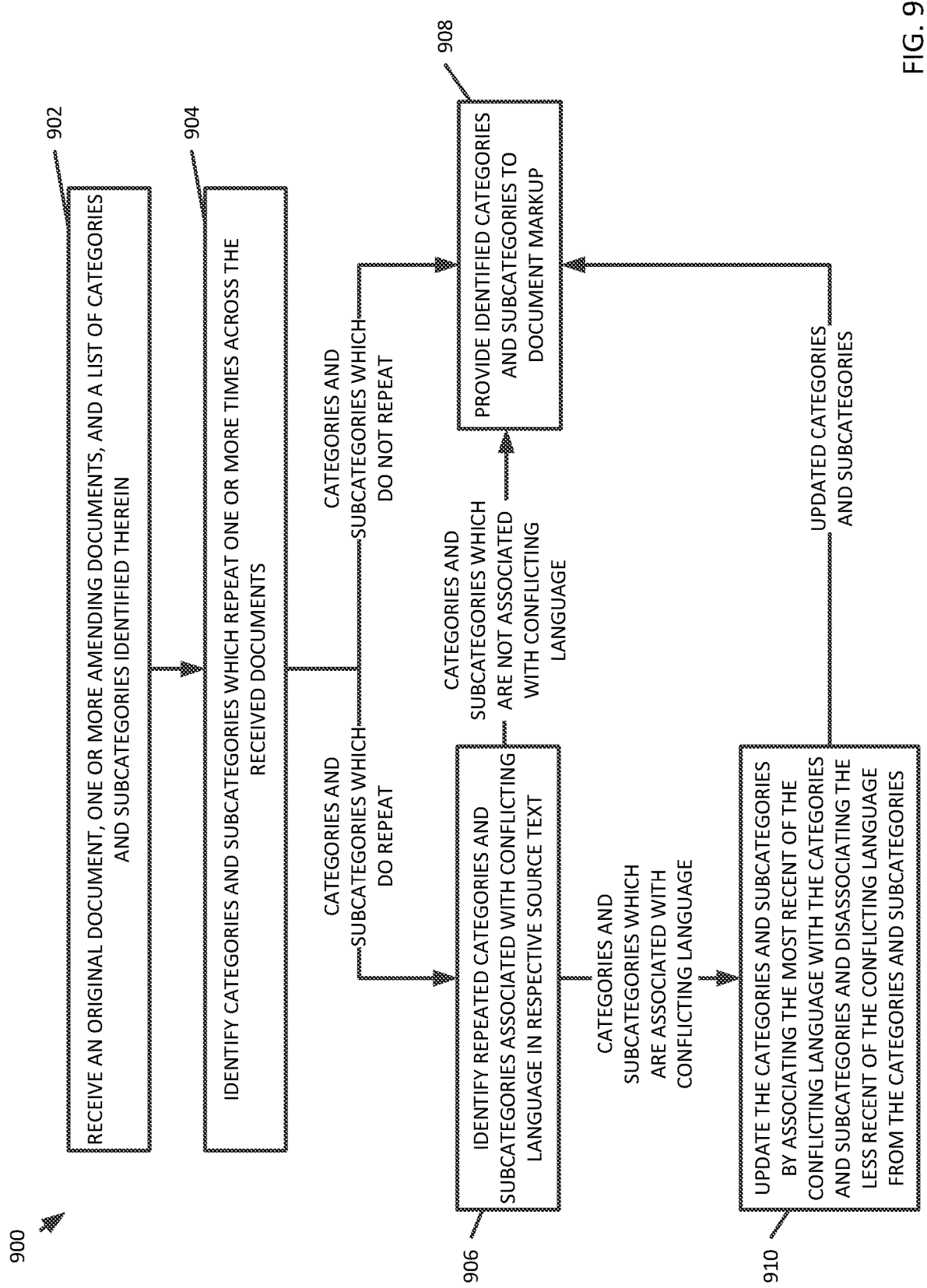
FIG. 9 is a flowchart of a method for producing categories and subcategories associated with amending documents, in accordance with various embodiments of the subject technology.
Figure 10:
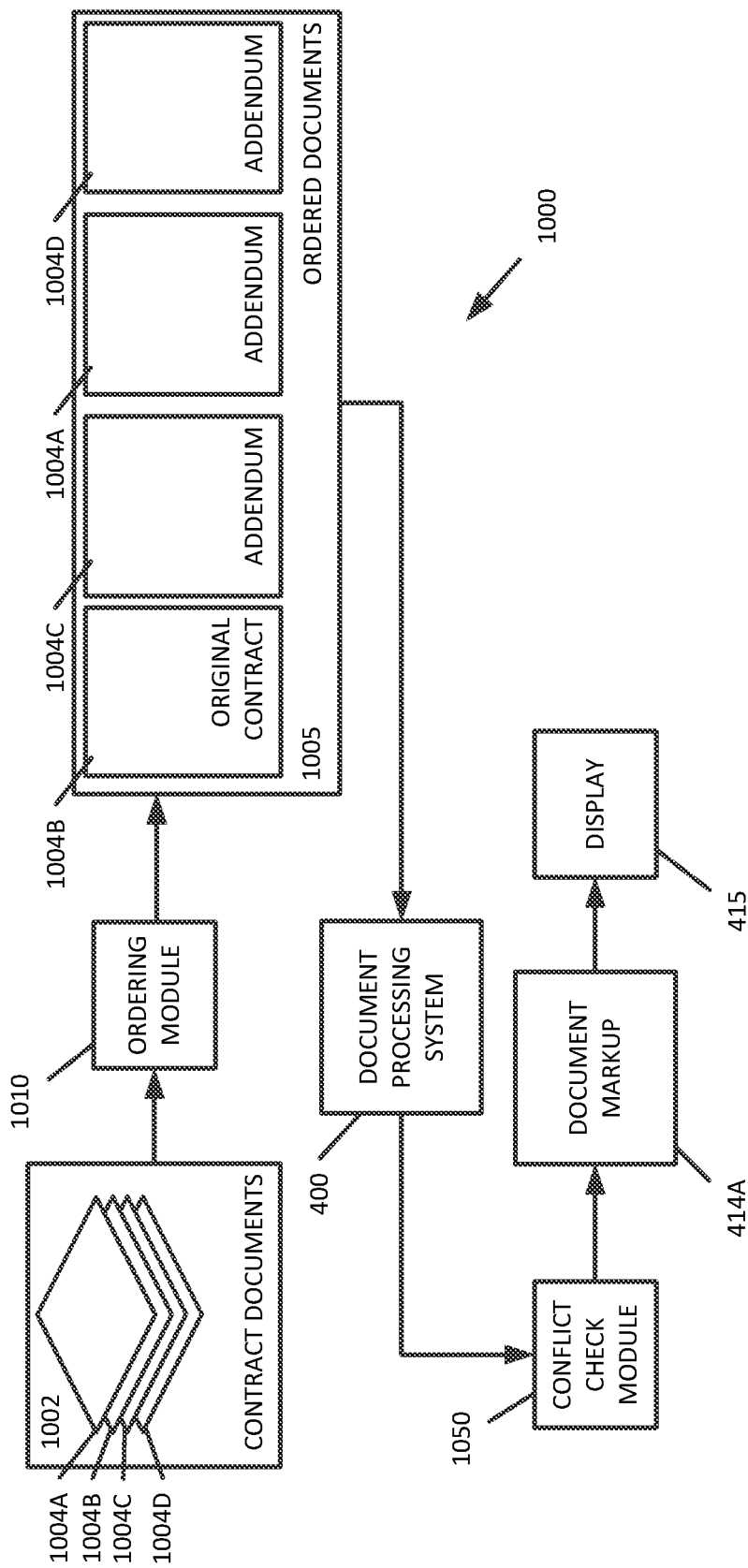
FIG. 10 is system diagram for a natural language processing system for documents including amendments, such as contract documents, in accordance with various embodiments of the subject technology.

In some embodiments, documents may include conflicting information associated with a category in different portions of the document. FIG. 9 depicts a method 900 for performing a conflict check on a list of categories and subcategories and can be included as part of the machine learning services platform 106. FIG. 10 depicts a system 1000 for the ordering and processing of a plurality of documents including an original document and one or more documents that amend or modify the original document. The list of categories and subcategories may be generated from an original document and one or more amending documents. The system 1000 includes the system 400 as a subsystem. The method 900 can be performed in addition to and concurrent with the method 200 and the operations of the method 900 may be interleaved with the operations of the method 200, as will be apparent to a person having ordinary skill in the art. Thus, the system 1000 may identify portions of an amendment as the same category and/or subcategory as portions of the main body of a respective document.

Referring now to FIGS. 9 and 10, a conflict check module 1050 may receive an original document and one or more amending documents along with a list of categories and subcategories identified in the received documents (operation 902). An ordering module 1010 may chronologically sort the documents, as further discussed below in reference to FIG. 11, beforehand to provide ordered documents 1005 to the document processing system 400 to identify categories and subcategories contained within the documents. In some embodiments, the identified categories and subcategories may already be associated with the text locations of the respective sections of text upon which they were identified (operation 210). In some other embodiments, where the identified categories of the received documents have yet to be associated with locations of text within the documents, the method 900 may be performed before operation 210 so that locations in the document images can then be associated with the identified categories and subcategories after the conflict check method 900 has provided an updated and accurate list of categories and subcategories.

The conflict check module 1050 may then identify categories and subcategories which appear multiple times across the set of received documents (operation 904). In some embodiments, this identification can be accomplished by incrementing a value associated with a category or subcategory every time that category or subcategory is seen for the first time in a document. For example, "royalties on oil and gas" may be identified in the original contract document and repeated in a third amending document, which causes a value associated with "royalties on oil and gas" to increment. Categories and subcategories that are repeatedly identified across multiple documents may represent amendments and/or modifications.

Categories and subcategories that are not identified as repeating across multiple documents (i.e., the associated value discussed above is "1") may be provided to the document mark-up 414A (operation 908), where associated text locations may be identified and rendered to a user through the display 415 as discussed above in reference to FIG. 4.

In contrast, categories and subcategories that are identified as repeating across multiple documents (i.e., the associated value discussed above is "2" or higher) may be further processed by the conflict check module 1050 to identify categories and subcategories, among the repeated categories and subcategories, which are associated with conflicting language in the respective text which caused the system 400 to identify the category or subcategory each time in the first place (operation 906). For example, the category "royalties on oil and gas" may be associated with text in the original document and also be associated with text in the third amending document, as discussed above. The associated text of the original document and of the third amending document may explicitly conflict (i.e., language expressly describes the text of the third amending document as replacing the text of the original document) or the associated text may implicitly conflict due to contradictory language (e.g., the language each document describes identical royalties but at different percentages).

Implicitly conflicted language may be identified by a trained machine learning model which has been trained to identify certain ontologies and which may identify the associated text as ontologically overlapping or, in other words, containing conflicting semantic content. In some embodiments, this overlap may be identified by vectorized words, sentences, and/or paragraphs occupying largely similar coordinate space in a SVM. It is to be understood that various tools and utilities for recognizing conflicting semantic content may be utilized, including, but not limited to, machine learning models, traditional rules-based techniques, or a mixture of the two. For example, a rule may exist that any provisions identified in an amendment that includes the words "The provisions found herein replace entirely and absolutely all prior versions" necessarily identify a conflict for all categories and subcategories identified for that document. In another embodiment, machine learning can be applied to detect statements having largely similar semantic content to "The provisions found herein replace entirely and absolutely all prior versions," such as "If there is conflict between this amendment and the Agreement or any earlier amendment, the terms of this amendment will prevail," and thus can apply the rule even when the language is not identical.

In the case that identified repetitive categories and/or subcategories are not associated with conflicting language in the respective source text, those categories and subcategories, along with the associated text, are provided to the document mark-up 414A (operation 908). For example, categories and subcategories can repeat and not be associated with conflicting text where a later document provides additional parties to an agreement or other material has been added in addition to the original document rather than replacing it.

Where the repeated categories and subcategories are associated with conflicting language, the text from less recent document (e.g., the original document) is disassociated from the category or subcategory and the association of the text of the most recent document and the category or subcategory is maintained (operation 910). The updated categories and/or subcategory are then provided to document mark-up 414A (operation 908). In some embodiments, the previous versions of the identified categories and subcategories may also be provided to document mark-up 414A in order to provide a version history of a provision to the user.

With respect to FIG. 10, a collection 1002 of contract documents 1004A-D is first received by an ordering module 1010. Documents 1004A-D may be received in any order and the ordering module 1010 will sort and order them into a chronological order. In some embodiments, a rule-based sorting may be employed whereby ordering module 1010 recognizes key words or characters associated with timing such as, for example, "10/23/2017" or "Oct. 23, 2017" and organize the documents according to the recognized key words or characters. In some embodiments, the ordering may be based on machine learning models trained to recognize a time component embedded, semantically or otherwise, into the text of the document. Other embodiments may include a mixture of rule-based and machine learning model approaches. For example, an amendment may make reference to an original contract as being the most recent (prior to the amendment) source of terms to the agreement, in which case the amendment may identified as immediately following the original contract, though no mention of a calendar date may be included in the amendment.

The ordering module 1010 may output a chronologically ordered set of documents 1005. The ordered documents 1005 may be organized differently than they are first received. For example, the original contract 1004B may be sorted to the front of the received documents (thus denoting an earlier date), even though it was received after addendum 1040A. As can be seen, the received documents are organized such that original contract 1004B precedes addendum 1004C, which precedes addendum 1004A, which precedes addendum 1004D. The document processing system 400, discussed above, can then receive the ordered documents in their correct sequence. However, where in some embodiments document processing system 400 may provide output directly to the document mark-up 414A and display 415, the conflict check module 1050 here can receive the data object 412B from the document processing system 400 provide a modified data object (containing categories and subcategories associated with only the most recent text) to document mark-up 414A. In this way, the ordering module 1010 and the conflict check module 1050 may be inserted into the architecture depicted in FIG. 4 to further enhance the value and utility of the system to users.

Figure 11:
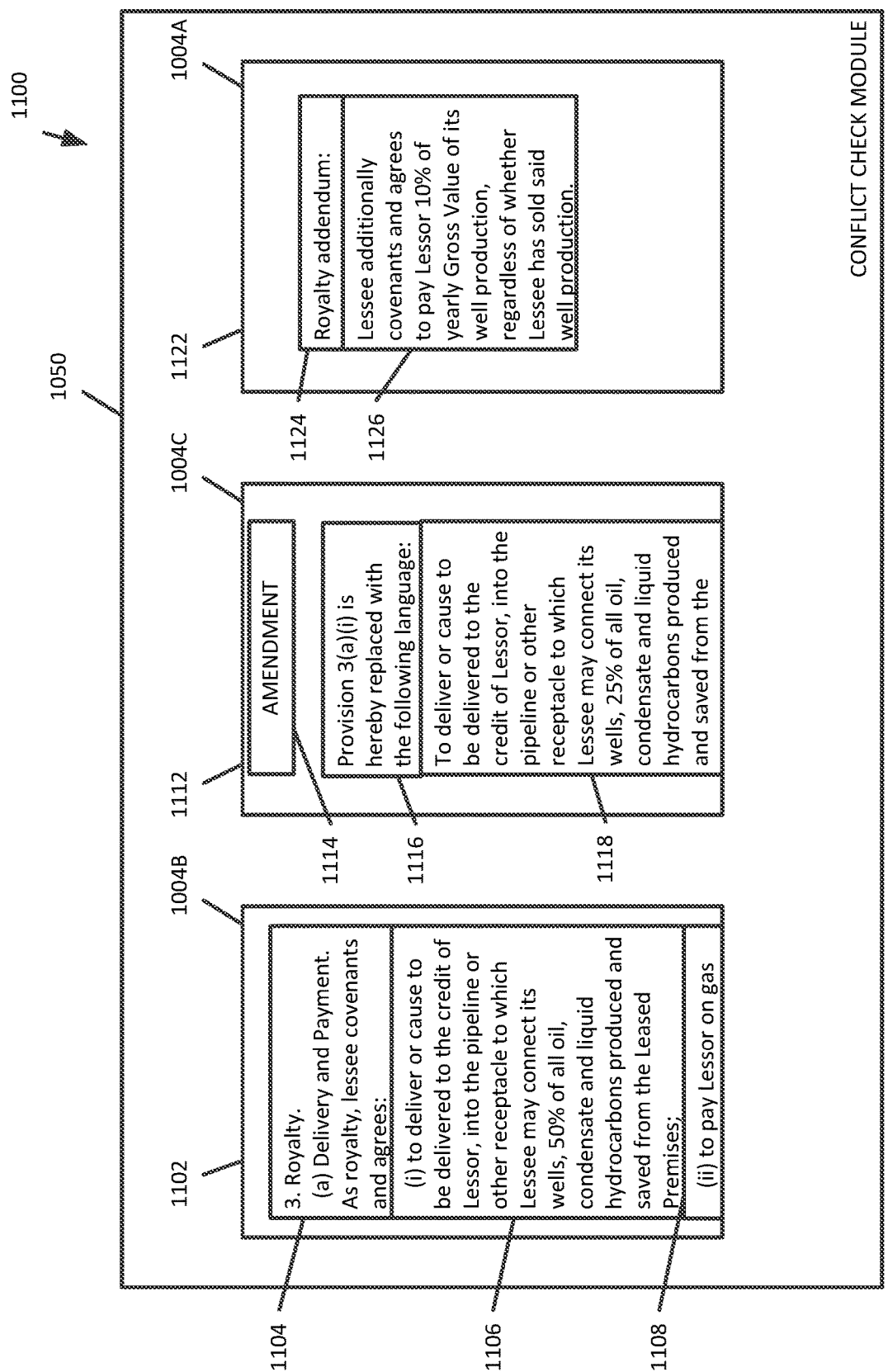
FIG. 11 is an illustration of the operation of a conflict check module, in accordance with various embodiments of the subject technology.

The conflict check module 1050 can perform the method 900 to identify conflicts and provide accurate categories and mappings to the document mark-up 414A. In some embodiments, the conflict check module 1050 may receive exemplar documents as depicted in FIG. 11. The conflict module 1050 may review an exemplary oil and gas document 1004B which is identified as a leading document 1102. Here, a paragraph 1104 has been identified as part of a provision describing royalty. A related paragraph 1106, which may be associated with the category "royalty on oil and gas," is also provided to the conflict check module 1050. Another paragraph 1108 is also identified and associated with a category that, as depicted here, does not cause a conflict for its respective category. Amendment 1004C may be received as a sequential document 1112. Here, document 1112 includes a header element 1114 describing the respective document as an amendment and, using a rule-based logic, the conflict check module 1050 identifies the document 1112 as an amendment. In some embodiments, the conflict check module 1050 may apply machine learning techniques or a combination of machine learning and rule-based logic to identify documents as amendments. The amendment 1004C includes paragraphs 1116 and 1118. The conflict check module 1050 may identify paragraph 1118 as being in conflict with the previously processed paragraph 1106 as a response to processing the language "Provision 3(a)(i) is hereby replaced with the following language:" of paragraph 1116. As a result, the category "royalties on oil and gas" is associated with the text of paragraph 1118 and replaces the association of the text of paragraph 1106 to the same category (i.e., "royalties on oil and gas"). The category may still be associated with the text of other documents, however, its associations have now been updated to conform with the text processed in the amendment 1004C.

The conflict check module 1050 may receive amendment 1004A as a next sequential document 1122. The document 1122 may lack an apparent identifier to inform the conflict check module 1050 that it is an amendment. In cases where there is no explicit identification that the document being processed is an amending document, the conflict check module 1050 can use machine learning models, rule-based logic, or a mix of the two to determine whether the document is an amendment. Here, the conflict check module 1050 identifies the document 1122 as an amendment and the paragraph 1126 is categorized as "royalties on oil and gas." Applying a rule-based logic to the language "Royalty addendum" of the paragraph 1124 which immediately precedes paragraph 1126, the conflict check module 1050 may identify paragraph 1126 as causing a conflict for any categories. As a result, the text of paragraph 1126 may be associated with the category "royalties on oil and gas" along with the text of paragraph 1118 and may be presented to a user as in a provided list of categories "royalties on oil and gas" (for example, within list 510 depicted in FIG. 5).

Figure 12:
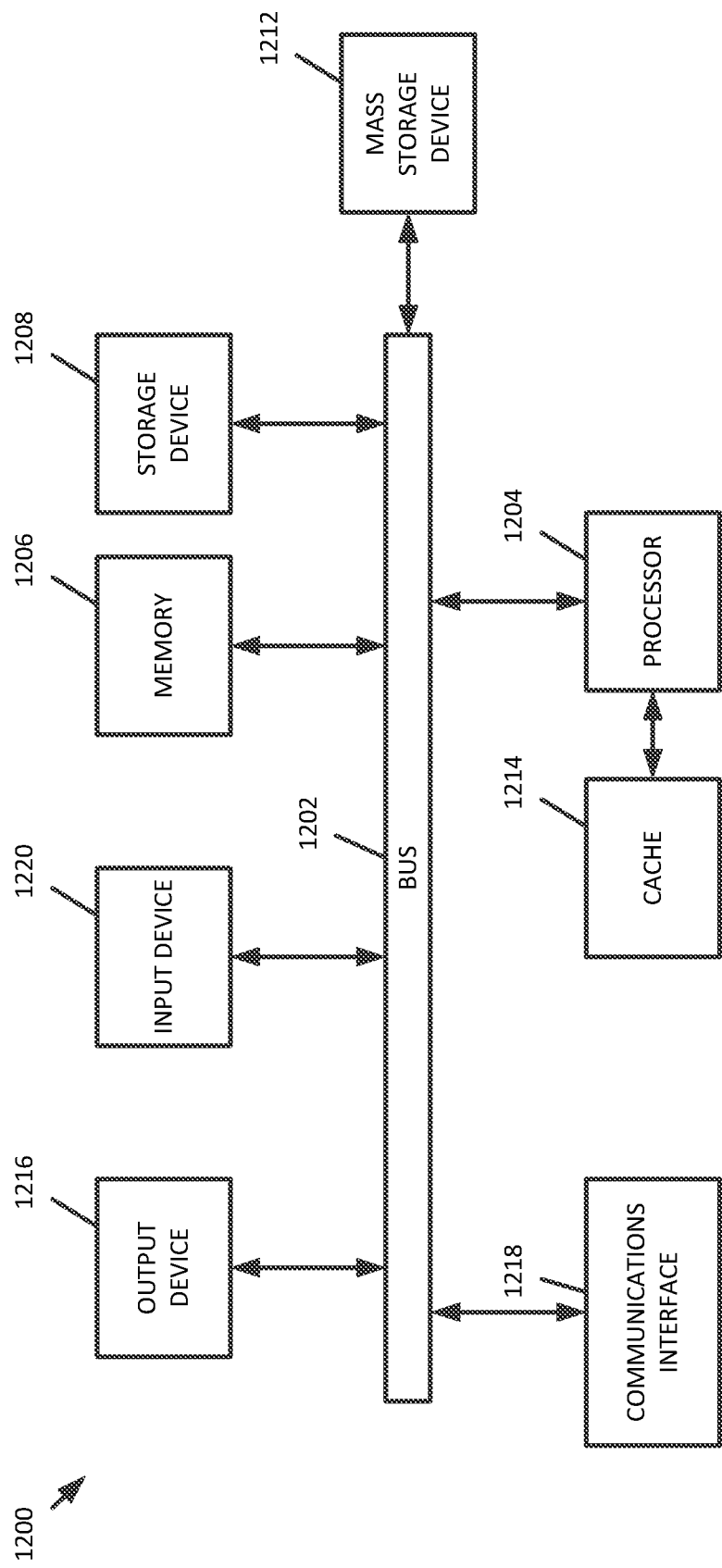
FIG. 12 is a system diagram of an example computing system that may implement various systems and methods discussed herein, in accordance with various embodiments of the subject technology.

FIG. 12 an example computing system 1200 that may implement various systems and methods discussed herein. The computer system 1200 includes one or more computing components in communication via a bus 1202. In one implementation, the computing system 1200 includes one or more processors 1204. The processor 1204 can include one or more internal levels of cache (not depicted) and a bus controller or bus interface unit to direct interaction with the bus 1202. The processor 1204 can include the OCR 404A, paragraph parser 406A, paragraph classifier 408A, sentence parser 410A, sentence classifier 412A, document mark-up 414A, paragraph model trainer 418A, sentence model trainer 424A, profiler 428A, and/or clustering service 432A and specifically implements the various methods discussed herein. Main memory 1206 may include one or more memory cards and a control circuit (not depicted), or other forms of removable memory, and may store various software applications including computer executable instructions, that when run on the processor 1204, implement the methods and systems set out herein. Other forms of memory, such as a storage device 1208 and a mass storage device 1212, may also be included and accessible, by the processor (or processors) 1204 via the bus 1202. The storage device 1208 and mass storage device 1212 can each contain any or all of the paragraph text database 416A, paragraph model database 420A, sentence text database 422A, sentence model database 426A, document database 430A, and profile model database 434A.

The computer system 1200 can further include a communications interface 1218 by way of which the computer system 1200 can connect to networks and receive data useful in executing the methods and system set out herein as well as transmitting information to other devices. The computer system 1200 can include an output device 1216 by which information is displayed, such as the display 450. The computer system 1200 can also include an input device 1220 by which information, such as oil and gas legal document 402, is input. Input device 1220 can be a scanner, keyboard, and/or other input devices as will be apparent to a person of ordinary skill in the art. The system set forth in FIG. 12 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In some embodiments, the system can identify amendments, addendum, and other later added or rewritten material relative to some original document or set of original documents. For example, many transactions in the oil and gas industry involve an original contract and multiple addenda, amendments, and other modifications to the agreement occurring after signing of the original contract, generally referred to simply as amendments. In such cases, particularly with older agreements having a long history between many and varying parties, it can be difficult and time-consuming to ascertain the current status of provisions. Amendments may alter or eliminate original provisions, and entirely new provisions may first appear in an amendment. Amendments may be written by different attorneys and according to different practices. The ordering of the amendments may also be unclear—some amendments may be individually dated and others may be part of a batch of documents dated by a cover sheet since lost or misplaced.

In the situations described above, a module or other additional component may be utilized to chronologically order an original contract and later amendments as well as correctly update identified categories and subcategories so as to both avoid conflicting provisions and ensure the list of categories and subcategories provided to a user are not out of date and are linked to the correct text location within the document image. The module or component can be run alone or as part of the system depicted by FIG. 4.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for producing a user interface comprising a navigable document image and a list of concepts contained within text of the document image, the method comprising:
   receiving, by a processor, an electronic document;
   receiving, by a trained machine learning model, a text of the electronic document, the machine learning model generating one or more categories and one or more subcategories based on respective analysis of paragraphs and sentences in the received text, the categories corresponding to concepts related to a content of the text, the one or more subcategories are associated with locations corresponding to the text based upon which the machine learning model generated the one or more subcategories;
   associating, by the processor, the one or more categories and the one or more subcategories with locations within the electronic document, wherein the locations correspond to the text based upon which the machine learning model generated the one or more categories and the one or more subcategories; and
   generating, by the processor, a graphical user interface that, when presented on a display device, simultaneously displays:
      a navigable image of the electronic document, wherein a user may view different areas of the electronic document by interacting with the graphical user interface; and
      a list of the one or more categories and the one or more subcategories generated by the machine learning model, each listed category and subcategory selectable and operably linked with the navigable image of the electronic document;
   wherein the navigable image of the electronic document navigates to a location within the navigable image of the electronic document in response to the user selecting a listed category or a listed subcategory, the location associated with the selected listed category or the listed subcategory.

2. The method of claim 1, wherein the machine learning model comprises one or more paragraph models, each paragraph model associated with a particular category and wherein each paragraph model is fed a paragraph of the text and outputs whether the text conforms to an associated particular category.

3. The method of claim 1, wherein the machine learning model comprises one or more sentence models, each sentence model associated with a particular subcategory and wherein each sentence model is fed a sentence of the text and outputs whether the text conforms to an associated particular subcategory.

4. The method of claim 1, wherein the electronic document is received as an image file and converted to a text format using optical character recognition software.

5. The method of claim 1, wherein the subcategories of the graphical user interface further include one or more text snippets associated with each subcategory, and each text snippet comprises a portion of the received text based upon which the machine learning model generated the associated subcategory.

6. The method of claim 5, wherein each text snippet is selectable and operably linked with the navigable image of the electronic document, and wherein selecting a text snippet causes the navigable image of the electronic document to navigate to the location associated with the text wherefrom the machine learning model generated the associated category.

7. The method of claim 5, wherein selecting a text snippet causes the graphical user interface to apply a visually identifying element to the location within the navigable image of the electronic document.

8. The method of claim 1, wherein selecting the category causes the graphical user interface to apply a visually identifying element to the location within the navigable image of the electronic document.

9. The method of claim 1, wherein conceptually similar categories are displayed more closely together.

10. The method of claim 1, wherein the machine learning model is trained using supervised machine learning techniques.

11. The method of claim 1, wherein the machine learning model is periodically retrained with new data.

12. The method of claim 1, wherein two or more processors are used to perform the entirety of the steps.

13. The method of claim 1, wherein the machine learning model is applied using parallel processes.

14. The method of claim 1, wherein the categories include parties, term, lease location and description, shut-in provisions, royalties on oil and gas, other royalties, pooling and units, title, assignment, surrender, retained acreage, surface, subsurface, payments and audit, legal, lease header, and unused.

15. The method of claim 1, wherein the subcategories include continuous drilling and operation, lessor name, lessee name, lessor address, lessee address, lease date, primary term, secondary term, gross acreage, state, county, royalty on oil provision, royalty percentage on oil, royalty on gas provision, royalty percentage on gas, cost fee royalty, shut-in royalty provision, shut-in period, shut-in price, acreage limitation, recordation requirements, special field rules, anti entireties, lessor warranty, warranty disclaimer, lessee furnished notice provisions, surrender obligations, surrender notice requirements, continuous drilling and operation provision, force majeure, surface Pugh clause, depth clause, surface usage restriction, geophysical and seismic provision, setback provision, payments, and lessor interest clause provision.

16. A non-transitory computer readable storage medium containing instructions which, when executed by a computer, cause the computer to perform the method of claim 1.

17. A system for producing a user interface comprising a navigable document image and a list of concepts contained within text of the document image, the system comprising:
   a processor; and
   a memory storing instructions, the instructions comprising:
   receiving an electronic document;
   receiving, by a trained machine learning model, a text of the electronic document, the machine learning model generating one or more categories and one or more subcategories based on respective analysis of paragraphs and sentences in the received text, the categories corresponding to concepts related to a content of the text, the one or more subcategories are associated with locations corresponding to the text based upon which the machine learning model generated the one or more subcategories;
   associating the one or more categories and the one or more subcategories with locations with the electronic document, the locations corresponding to the text based upon which the machine learning model generated the one or more categories and the one or more subcategories; and
   generating a graphical user interface that, when presented on a display device, simultaneously displays:
      a navigable image of the electronic document, wherein a user may view different areas of the electronic document by interacting with the graphical user interface; and
      a list of the one or more categories and the one or more subcategories generated by the machine learning model, each listed category and subcategory selectable and operably linked with the navigable image of the electronic document;
   navigable image of the electronic document in response to the user selecting a listed category or a listed subcategory, the location associated with the selected listed category or the listed subcategory.

18. The system of claim 17, wherein the machine learning model comprises one or more paragraph models, each paragraph model associated with a particular category and wherein each paragraph model is fed a paragraph of the text and outputs whether the text conforms to an associated particular category.

19. The system of claim 17, wherein the machine learning model comprises one or more sentence models, each sentence model associated with a particular subcategory and wherein each sentence model is fed a sentence of text and outputs whether the text conforms to an associated particular subcategory.

20. The system of claim 17, wherein the electronic document is received as an image file and converted to a text format using optical character recognition software.

21. The system of claim 17, wherein the subcategories of the graphical user interface further include one or more text snippets associated with each subcategory, and each text snippet comprises a portion of the received text based upon which the machine learning model generated the associated subcategory.

22. The system of claim 21, wherein each text snippet is selectable and operably linked with the navigable image of the electronic document, and wherein selecting a text snippet causes the navigable image of the electronic document to navigate to the location associated with the text wherefrom the machine learning model generated the associated category.

23. The system of claim 21, wherein selecting a text snippet causes the graphical user interface to apply a visually identifying element to the location within the navigable image of the electronic document.

24. The system of claim 17, wherein selecting a category causes the graphical user interface to apply a visually identifying element to the location within the navigable image of the electronic document.

25. The system of claim 17, wherein conceptually similar categories are displayed more closely together.

26. The system of claim 17, wherein the machine learning model is trained using supervised machine learning techniques.

27. The system of claim 17, wherein the machine learning model is periodically retrained with new data.

28. The system of claim 17, further comprising an additional processor for performing the stored instructions.

29. The system of claim 17, wherein the machine learning model is applied using parallel processes.

30. The system of claim 17, wherein the categories include parties, term, lease location and description, shut-in provisions, royalties on oil and gas, other royalties, pooling and units, title, assignment, surrender, retained acreage, surface, subsurface, payments and audit, legal, lease header, and unused.

31. The system of claim 17, wherein the subcategories include continuous drilling and operation, lessor name, lessee name, lessor address, lessee address, lease date, primary term, secondary term, gross acreage, state, county, royalty on oil provision, royalty percentage on oil, royalty on gas provision, royalty percentage on gas, cost fee royalty, shut-in royalty provision, shut-in period, shut-in price, acreage limitation, recordation requirements, special field rules, antientireties, lessor warranty, warranty disclaimer, lessee furnished notice provisions, surrender obligations, surrender notice requirements, continuous drilling and operation provision, force majeure, surface Pugh clause, depth clause, surface usage restriction, geophysical and seismic provision, setback provision, payments, and lessor interest clause provision.

* * * * *